United States Patent

Sekimoto

[15] 3,666,888

[45] May 30, 1972

[54] PCM-TV SYSTEM USING A UNIQUE WORD FOR HORIZONTAL TIME SYNCHRONIZATION

[72] Inventor: Tadahiro Sekimoto, Tokyo, Japan

[73] Assignee: Communications Satellite Corporation

[22] Filed: June 26, 1968

[21] Appl. No.: 740,310

[52] U.S. Cl. ..............178/69.5 TV, 178/DIG. 3, 178/67.5 G, 178/56, 178/15.55 B

[51] Int. Cl. ..........................................................H04n 5/38

[58] Field of Search................178/69.5 TV, 69.5 G, 6 B, 5.6, 178/5.8, 6.8; 179/15.55, 15 BW, 2 TV, 15 AP

[56] References Cited

UNITED STATES PATENTS

| | | | |
|---|---|---|---|
| 3,299,204 | 1/1967 | Cherry et al | 178/6 B |
| 3,403,226 | 9/1968 | Wintringham | 178/6 B |
| 3,435,134 | 3/1969 | Richards | 179/15.55 |
| 3,463,876 | 8/1967 | Law | 179/15.55 |
| 3,571,505 | 3/1971 | Mounts | 178/6.8 |
| 3,384,709 | 5/1970 | Quinlan | 179/2 TV |
| 3,472,953 | 10/1969 | Montevecchio | 178/6.8 |
| 3,435,148 | 3/1969 | Yoshine | 179/15 AP |
| 3,492,432 | 1/1970 | Schimpf | 179/15 AP |

OTHER PUBLICATIONS

Masters IBM Technical Disclosure Bulletin, Vol. 9, No. 7, Dec. 1966, page 875

*Primary Examiner*—Robert L. Griffin
*Assistant Examiner*—Richard P. Lange
*Attorney*—Sughrue, Roth, Mion, Zinn & Macpeak

[57] ABSTRACT

In a communication system for transmitting and receiving television information by means of digital codes, the horizontal sync pulses are transformed into a code word, thus leaving time slots in the transmitted waveform which are unoccupied by the digital picture information or the code word representing horizontal synchronization. These time slits are used to transmit additional information such as multiple sound or data channels, or bandwidth compression information. In the case of multiple sound or data channels, the channels are multiplexed and coded and transmitted during the available time slots at a bit rate which is the same as the digital picture information bit rate. In the case of bandwidth compression, an address code word is annexed to the single horizontal synchronization code word to provide an address for each line of picture information in a television frame. With all lines identified by addresses, the system compares each line of picture information with a prior line of picture information having the same address and transmits to the receiver only those lines which represent changes of a certain degree from a prior frame. As a result, redundant picture information is not transmitted thereby reducing the total amount of information transmitted, allowing the transmitter to operate at a reduced bit rate. The receiver stores all lines of information and the storage is up-dated by the received non-redundant lines of picture information. During each frame period, the receiver extracts from storage the redundant lines necessary to complete a picture frame.

16 Claims, 30 Drawing Figures a b c

INVENTOR
TADAHIRO SEKIMOTO

BY Sughrue, Rothwell, Mion, Zinn & Macpeak
ATTORNEYS

PCM-TV SYSTEM USING A UNIQUE WORD FOR HORIZONTAL TIME SYNCHRONIZATION

BACKGROUND OF THE INVENTION

In present day television systems, the horizontal blanking interval which is about 10 microseconds is necessary for retrace and recovery of TV horizontal sweep circuits in the TV receivers. The picture signal interval per horizontal line is about 53 microseconds. This fact means that about 16 percent of a complete horizontal lines period is spent for retrace and recovery of the horizontal sweep circuits. In a PCM-TV transmission system, the horizontal blanking signal need not be transmitted, but instead a unique word can be transmitted for every horizontal line in place of the blanking signal. According to prior experience, 20 or 30 bits of unique word length would be more than sufficient for highly reliable synchronization timing. The interval for transmitting the unique word is, of course, dependent upon the bit rate of the digital system used, and the time interval would be relatively small since a high bit rate is necessary for PCM-TV transmission. Therefore, most of the horizontal blanking interval will be available for other purposes, such as transmitting sound channels, data channels, bandwidth compression information, etc.

An example of one advantage of transmitting additional information during the horizontal blanking interval is that it would be possible to transmit several sound channels with no additional frequency bandwidth requirement. For international television transmission, it would be possible to send out several sound channels, one for each foreign language. For example, a baseball game could be transmitted to the world with announcements in English, Spanish, French, Chinese and Japanese. The game can be presented by one picture and multiple announcers who speak the national language of the country to which the broadcast is directed, using those terms of expression which the baseball fans are accustomed to listening to. Every sound channel could be multiplexed and transmitted along with the single picture. Since the multiplexed sound channels could be sent at the same bit rate as the picture information bit rate, and during available times within each horizontal line, there would be no additional bandwidth requirement to transmit the multiple sound channels.

Also, it would be easy to provide data signals instead of sound signals because both data and sound signals have the same characteristics in the digital transmission system. Television broadcasting companies could give many different kinds of services to home receivers by using data channels without interrupting TB picture service.

One important use of the available time within the horizontal blanking interval is the transmission of information that can be used to produce bandwidth compression of the transmitted information. With ever-increasing traffic via radio waves, the need for reducing the bandwidth for a given amount of information, or stated another way, the need for increasing the amount of information which can be transmitted with an assigned bandwidth, is becoming greater. In accordance with one aspect of the present invention, bandwidth compression is achieved by using coded words to identify the position of each line of picture information, and blocking the transmission of those lines of picture information which are redundant with respect to the corresponding line of picture information in a prior frame. Thus, only changes in the television picture will be transmitted and since each non-redundant line is transmitted along with an identifying code word, the receiver is capable of putting the received line into a proper slot of a storage system which always contains an entire frame of information that can be scanned and read out in a line-by-line sequence.

In order to gain a better understanding of the present invention, a detailed description of certain preferred embodiments of the invention as shown in the accompanying drawings, will now be presented.

Figures 12, 13:
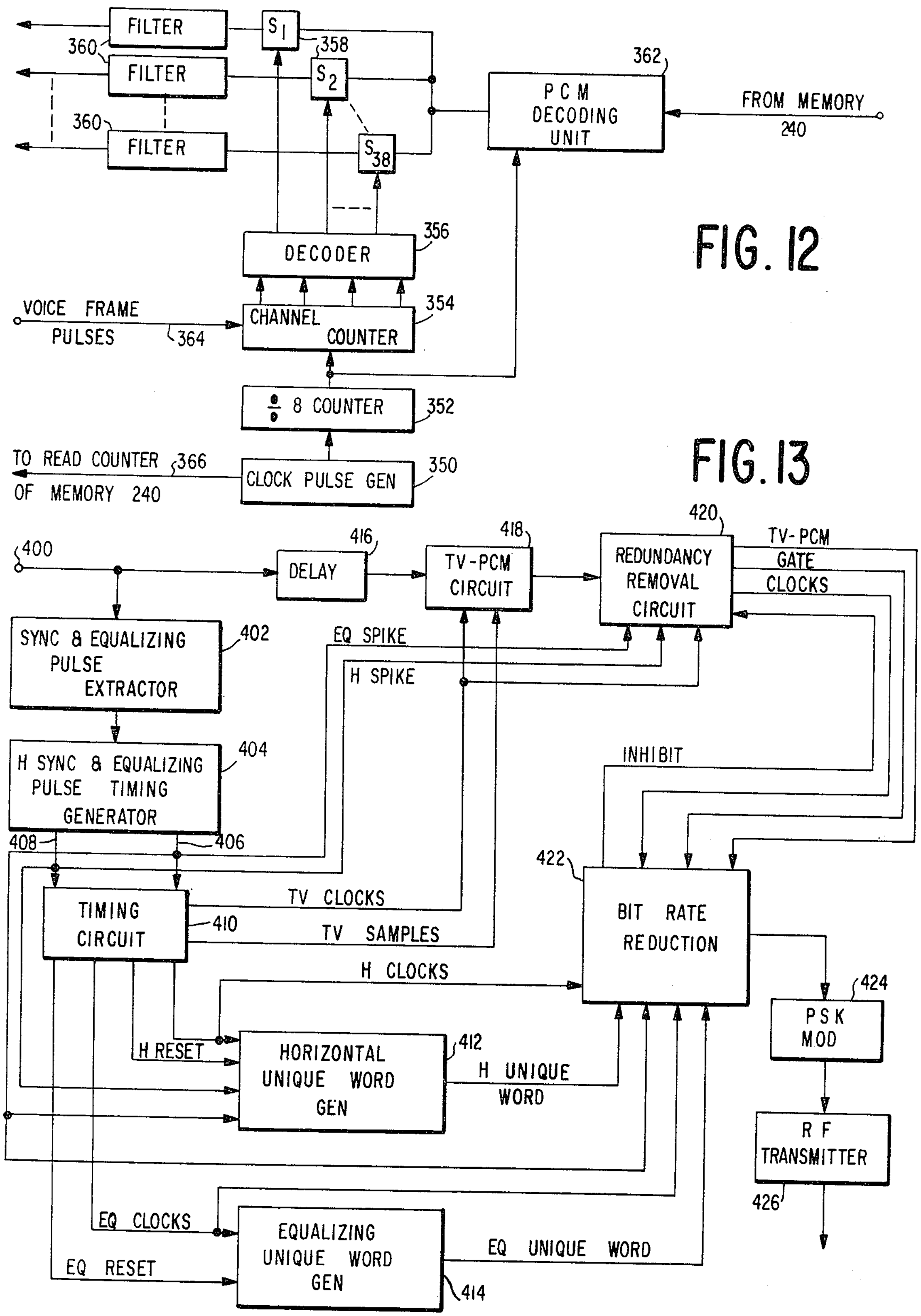
FIG. 12 is a block diagram of a typical voice PCM and multiplexing system which may be used in the receiver of FIG. 8.
FIG. 13 is a block diagram of a transmitter in accordance with the present invention which provides bandwidth compression of the television signal.
Figure 17:
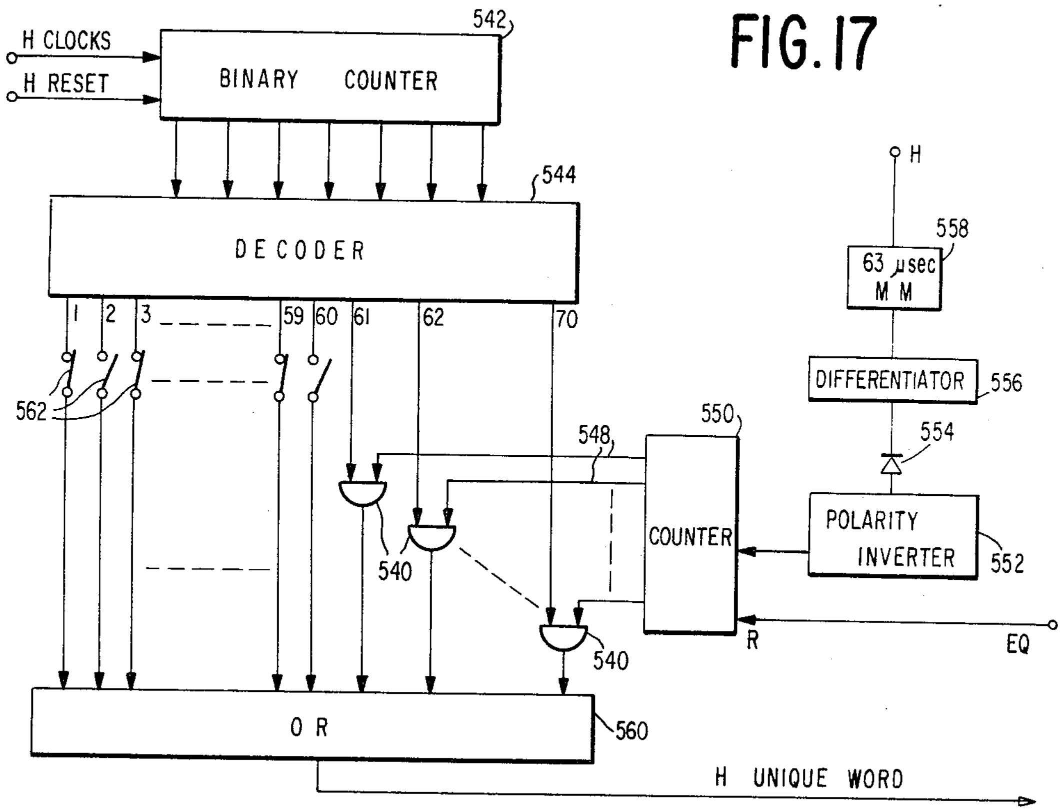
FIG. 17 is a block diagram of a code generator which may be used in the transmitter of FIG. 13.
Figures 20, 21A:
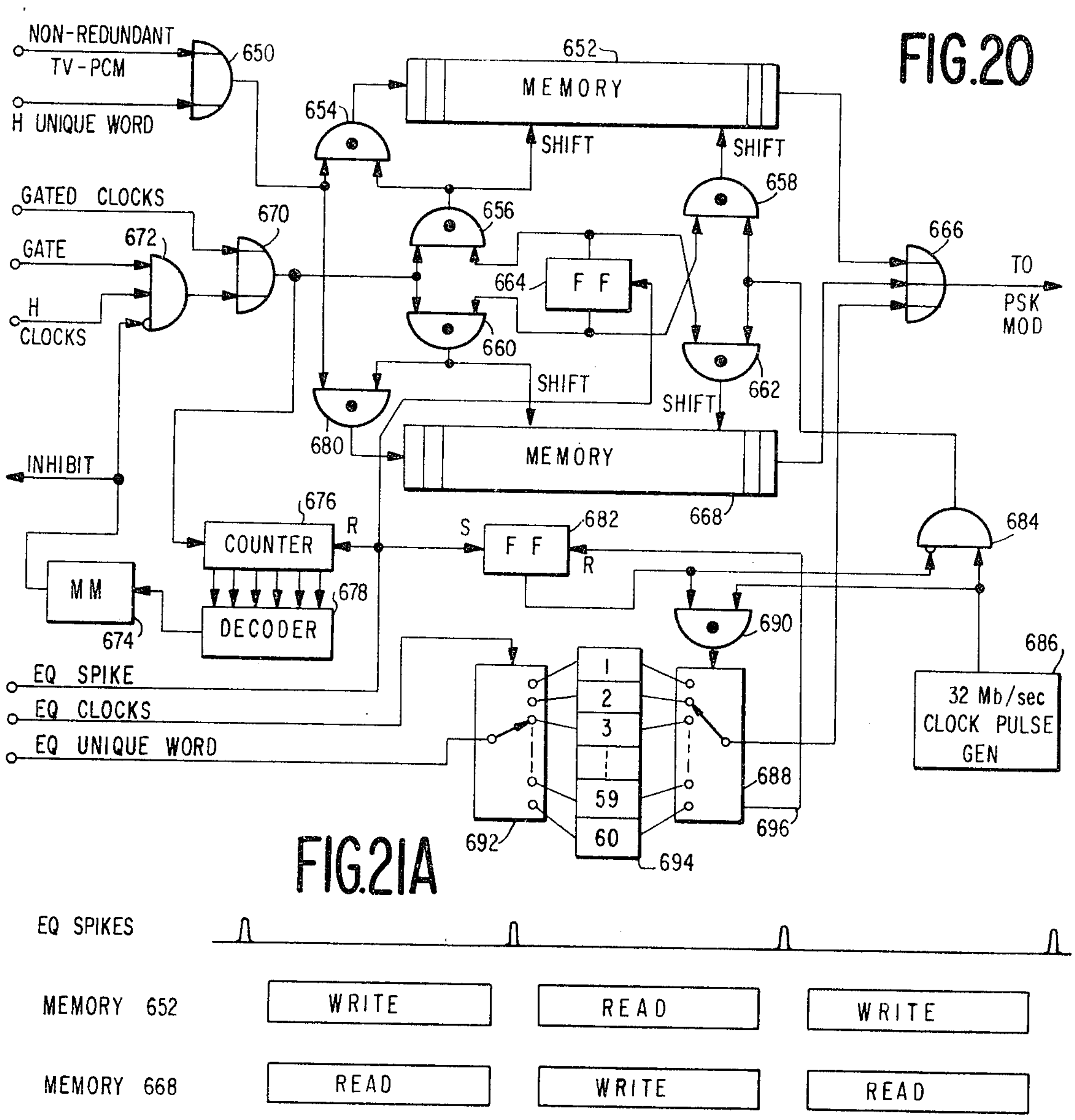
FIG. 20 is a block diagram of a bit rate reduction circuit which may be used as part of the transmitter of FIG. 13.
Figure 21B:
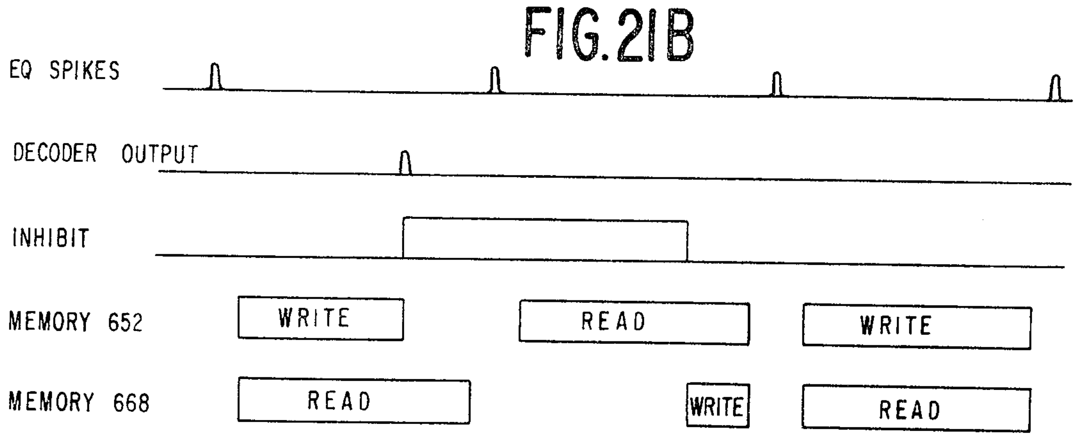
Figure 22:
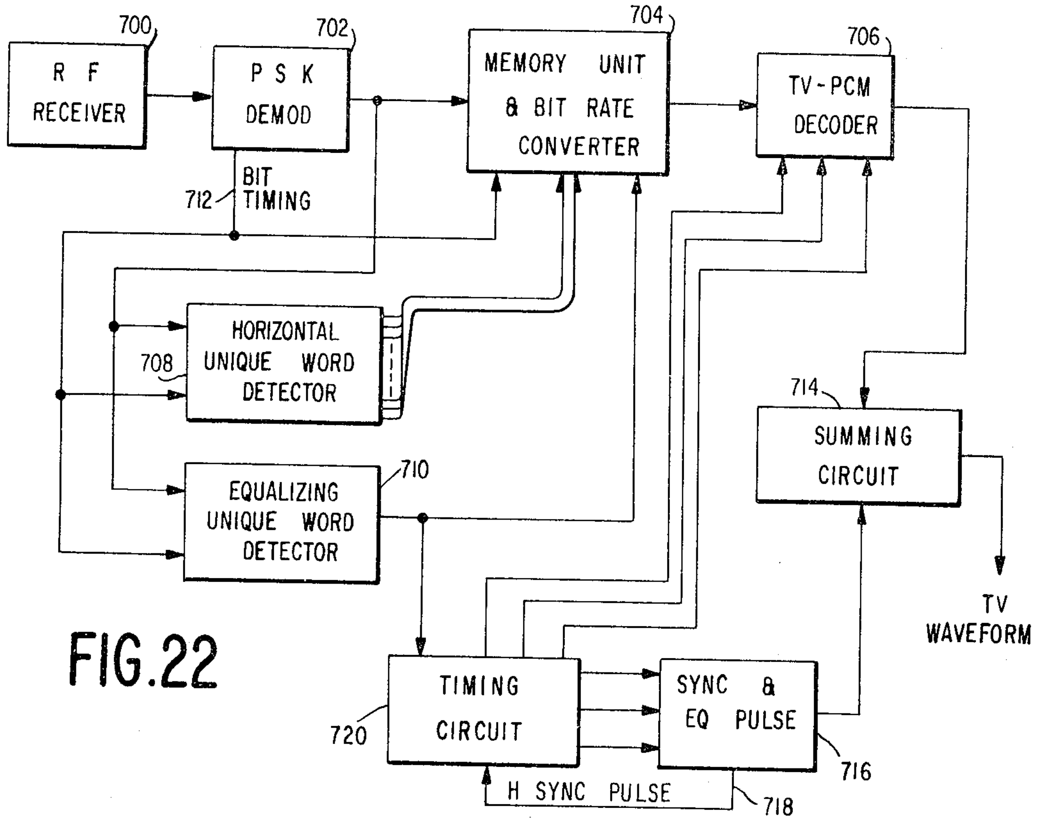
Figure 23:
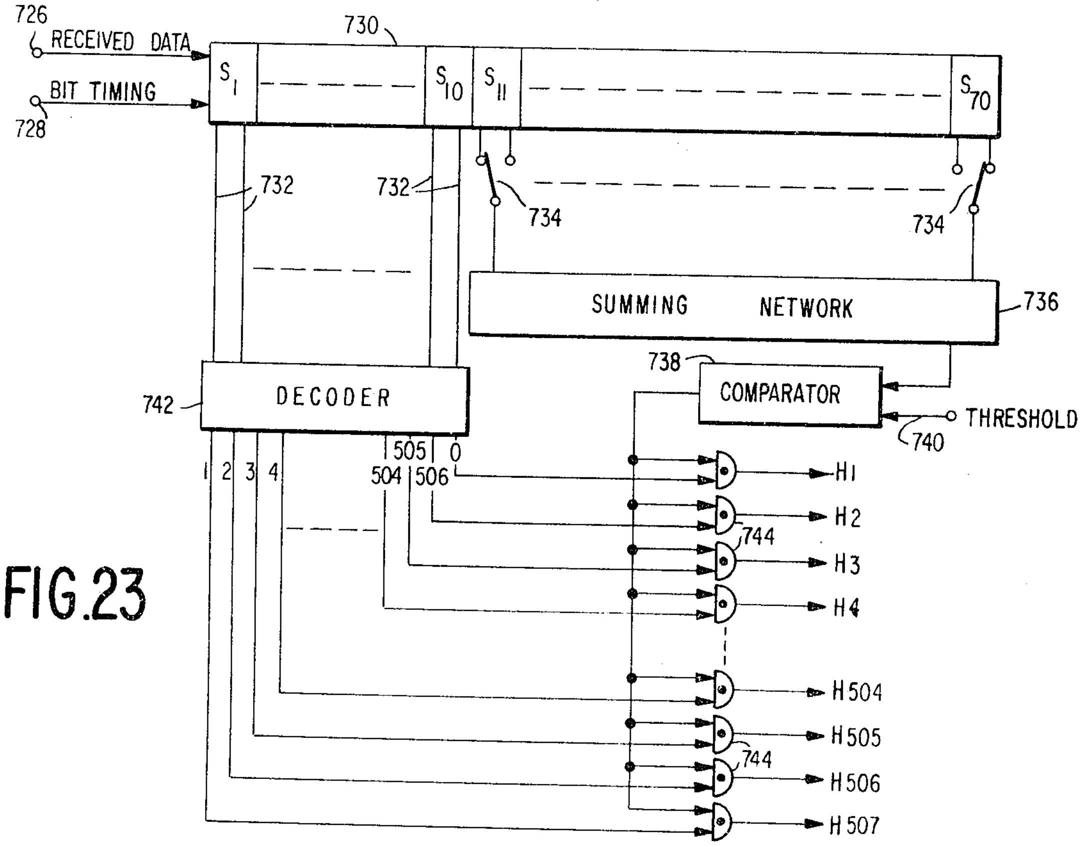
Figure 24:
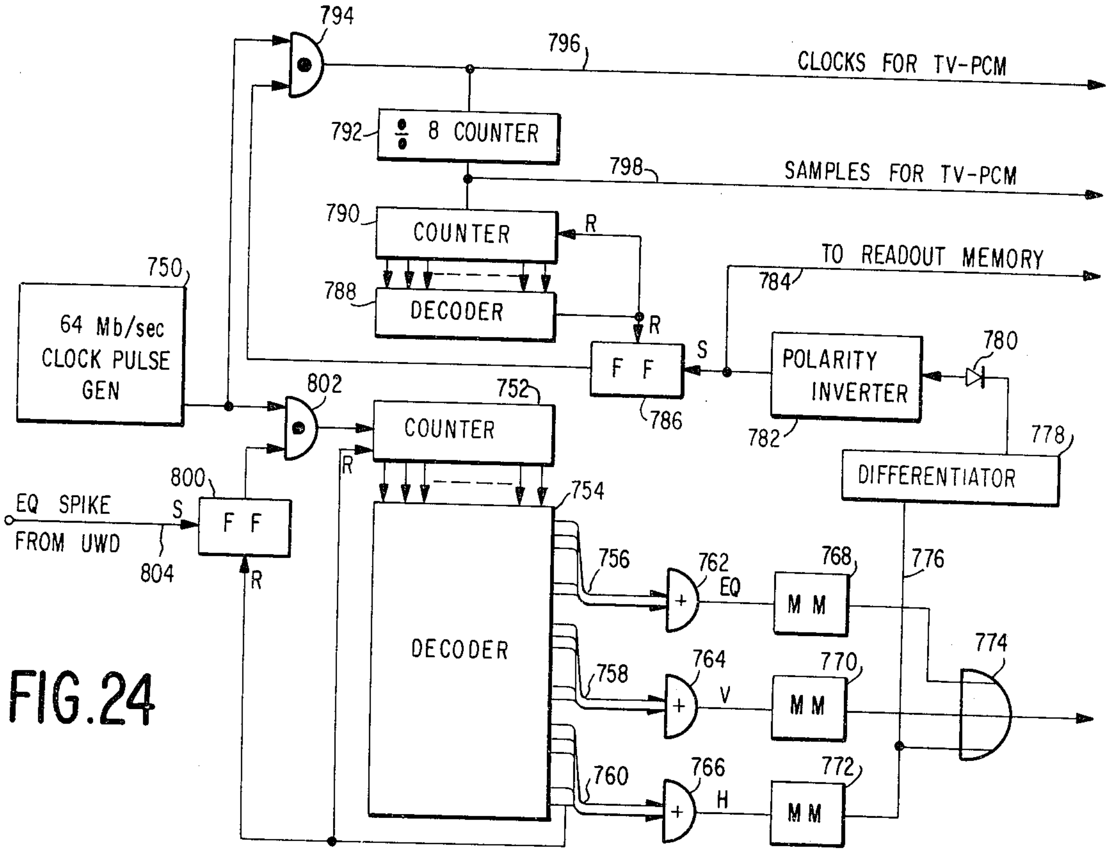
Figure 26:
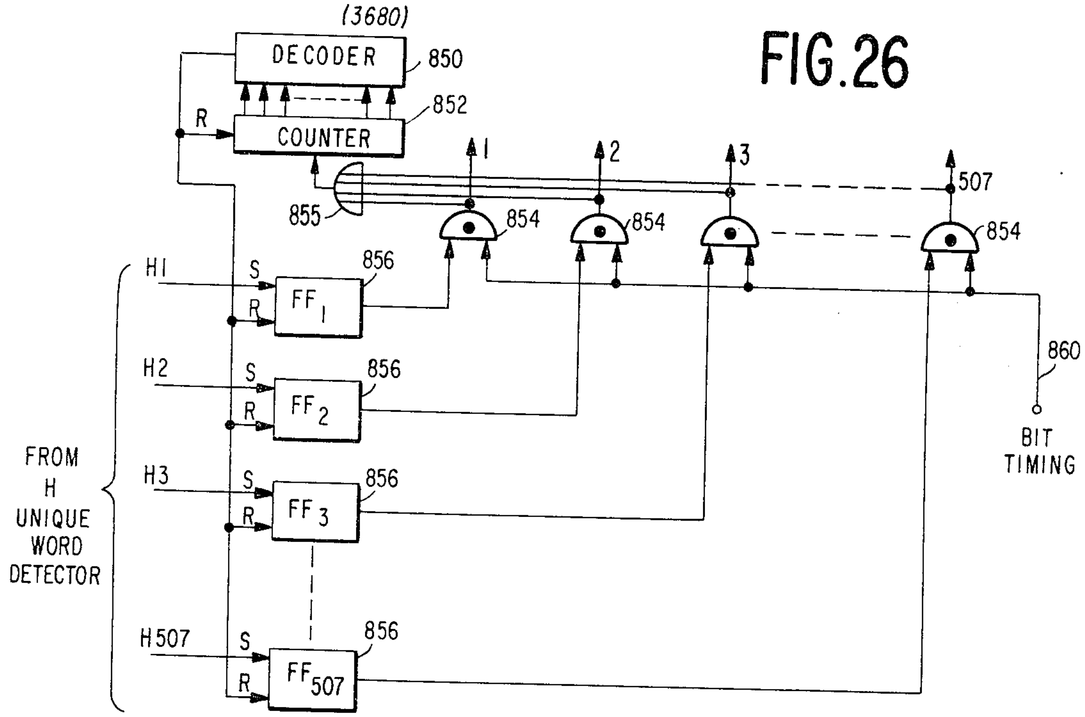
Figures 25, 27:
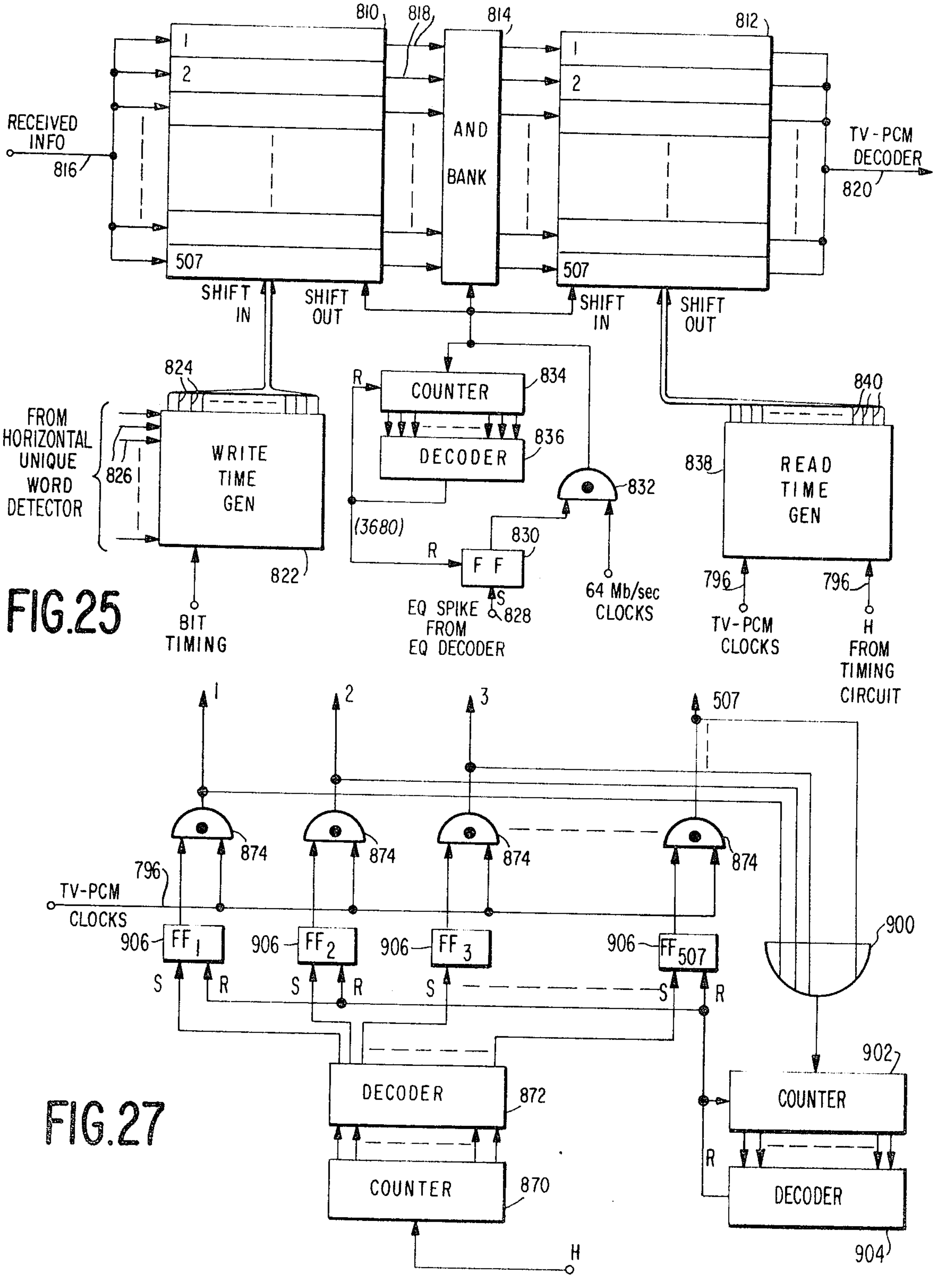

FIGS. 21*a* and 21*b* are timing diagrams which illustrate the relative times of certain events in the transmitter of FIG. 13;

FIG. 22 is a block diagram of a receiver in accordance with the present invention which is adapted to receive the information transmitted by the transmitter of FIG. 13;

FIG. 23 is a block diagram of a decoding circuit which is capable of decoding code words which are generated by the coding generator of FIG. 17;

FIG. 24 is a block diagram of a timing circuit and pulse generator which generates all of the pulses necessary for complete television waveform and which forms a part of the receiver of FIG. 22;

FIG. 25 is a block diagram of a storage system which may be used as part of the receiver of FIG. 22; and FIGS. 26 and 27 are block diagrams respectively of the write and read-out controls for the memory of FIG. 25.

Although the invention is not limited to any particular frequencies, bit rates, numbers of lines per frame, maximum voice frequencies, etc., the following numbers are presented for the purpose of facilitating a detailed description of the invention. Throughout the remainder of the specification, the numbers below will be referred to often, but it should be remembered that they are exemplary and not limitations of the scope of the invention.

TELEVISION CONSTANTS

1. Each television frame consists of 507 lines arranged in an interlaced scanning pattern. Each frame is composed of two fields.

2. The maximum expected frequency of the video signal is 4Mc.

3. The sampling frequency of the TV–PCM encoder is 8Mc or twice the maximum expected video frequency.

4. There are 8 bits per sample in the TV–PCM output, necessitating a clock frequency of $8 \times 8 = 64$ megabits per second.

5. The number of TV–PCM samples per line equals $$\frac{\frac{1}{15.75 \times 10^{-3}} - (1.27 + 4.75)}{0.125} = 460$$

The terms of the above equation are:

$1/(15.75 \times 10^{-3})$microseconds = Horizontal line length in microseconds.

4.75 microseconds =Horizontal blanking pulse width.

1.27 microseconds =Distance between end of video of one line and horizontal blanking pulse; sometimes referred to as "front porch" of the horizontal blanking pulse.

Numerator =That portion of each line which is sampled.

Denominator =Sampling period = (1/8 Mc)

6. The number of TV–PCM bits per line equals (8 bits per sample) × (460 samples per lines) = 3680.

VOICE CONSTANTS

7. Maximum expected frequency in a sound channel equals 7.875 kc.

8. Voice–PCM sampling frequency per sound channel equals 15.75 kc (should be twice the maximum expected frequency).

9. Number of bits per sample equals 8 bits.

10. Clock frequency per sound channel equals 126 kilobits per second = (8 × 15.75).

11. 38 sound channels are transmitted.

12. 38 channel clock frequency = 4.788 megabits per second = (126 × 38).

UNIQUE WORD

13. Each horizontal unique word is 60 bits long.

In the case of bandwidth compression an extra 10 bits are added to each horizontal unique word to identify each individual line within a field.

It should be noted that for the above exemplary numbers, the 1.27 microsecond "front porch" is sufficient time for sending out a 60 or 70 bit unique word, and the 4.75 microsecond horizontal blanking pulse width is sufficient time to transmit 38 voice channels.

Figure 1A:
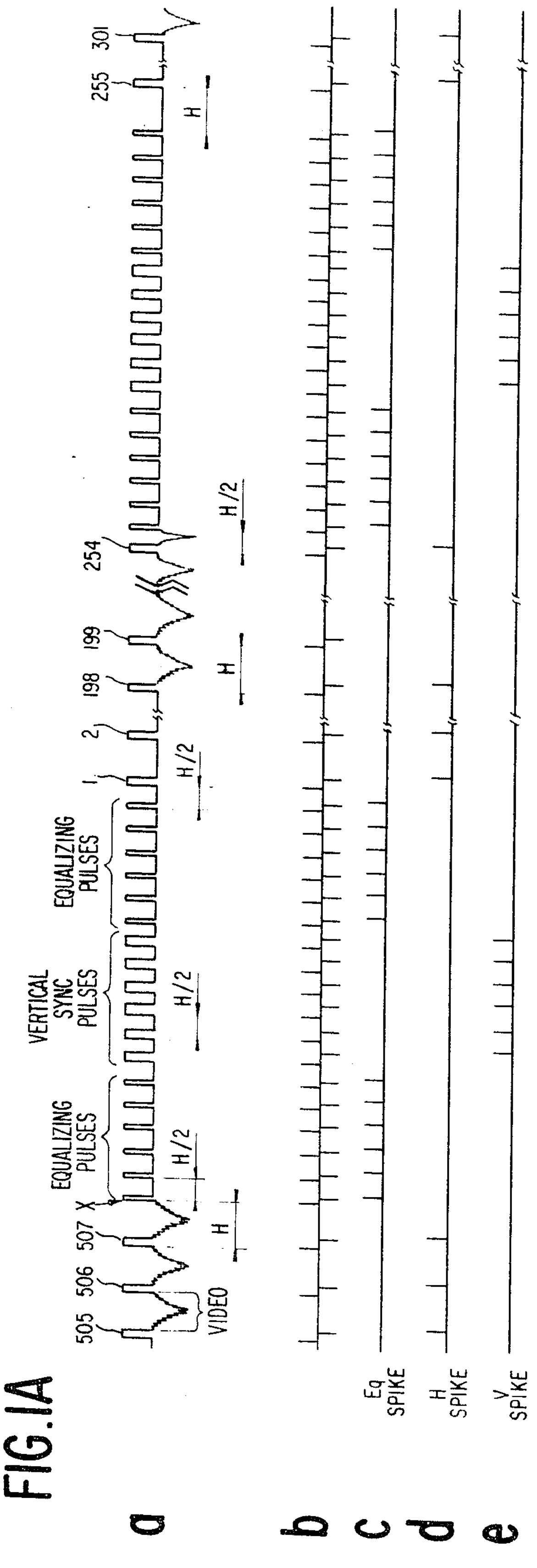
FIGS. 1A and 1B are waveform diagrams which are useful in understanding the operation of the present invention.

In waveform a of FIG. 1A, there is shown a typical example of a TV signal including vertical and horizontal sync pulses, video information, equalizing pulses, and color burst. The type of signal shown is conventional and would appear in a normal TB transmission system. The particular format of the waveform shown is that which would occur for an interlaced scanning system in which each frame is 525 lines long. As illustrated in the diagram, the prior frame terminates at point X on the graph and the new frame begins at the same point. The frame begins with six equalizing pulses followed by six vertical sync pulses followed by six more equalizing pulses. The vertical sync pulses and the equalizing pulses are separated by a distance H/2, where H is the horizontal line time. Typically, the equalizing pulses will be 2.4 microseconds in width and the vertical sync pulses will be 27 microseconds in width. The group of 12 equalizing pulses and six vertical sync pulses which follows the beginning of the frame will be referred to hereinafter as the Field I sync group. The latter designation is used only for the purpose of distinguishing between the two groups of equalizing and vertical sync pulses, the first group preceeding the first field of the frame and the second group preceeding the second field of the frame.

Following the last equalizing pulse of the Field I sync group are a plurality of horizontal sync pulses (254 in the particular example described) which are separated by a distance H. It should also be noted that the first horizontal sync pulse following the last equalizing pulse is separated therefrom by distance H/2. The color burst information, if there is color transmission, and the video information for the particular line, follows the particular horizontal sync pulses and are referred to collectively herein as the picture information. It will be noted from the diagram that the first few horizontal sync pulses do not have any video associated therewith. This is conventional in TV transmission and usually occurs for only the first few lines.

The last horizontal sync pulse within the first field is followed by the Field II sync group which comprises six equalizing pulses followed by six vertical sync pulses followed by six more equalizing pulses. The first equalizing pulse within the Field II sync group is separated from the beginning of the last horizontal sync pulse 254 within the first field by the distance H/2. Following the last equalizing pulse of the Field II sync group are the remaining horizontal sync pulses and associated video information. Since the diagram represents the television transmission signal used in an interlaced scanning TV system, the first horizontal sync pulse follows the Field I sync group by H/2 whereas the first horizontal sync pulse in the second field follows the Field II sync group by distance H. The converse relation, as can be seen in the diagram, is true for the last horizontal pulse in each field and the Field I and II sync groups.

Since the frame time is 525 H, and since each field sync group occupies a space of 9H, there will be 507 horizontal sync pulses per frame. The first few horizontal sync pulses following each field sync group are inactive, i.e., no video associated therewith. There will be about 17 inactive sync pulses per frame.

Figure 1B:
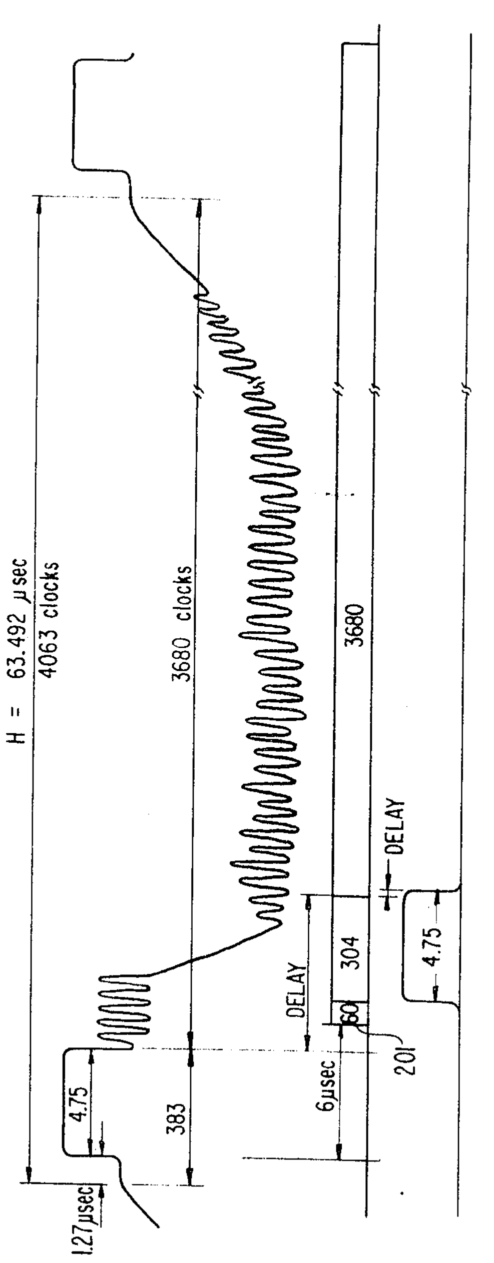

A portion of the total waveform diagram representing the horizontal sync pulses and the associated video is illustrated in FIG. 1B. As shown in that figure, each horizontal line includes a 1.27 microsecond front porch, followed by a 4.75 microsecond horizontal blanking pulse, followed by a color burst frequency (if color transmission is involved), followed by the line video information. In a first embodiment of the invention described herein, the unique word and the 38 channels of sound are transmitted during the 5.97 microseconds normally occupied by the front porch and horizontal blanking pulse.

Figure 2:
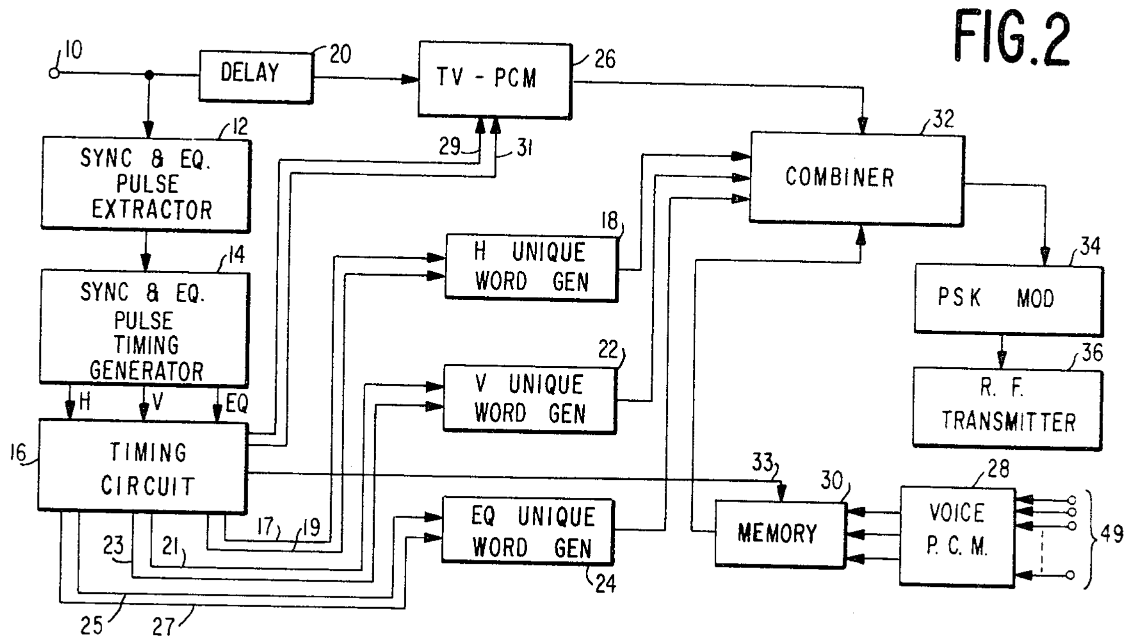
FIG. 2 is a block diagram of a transmission system in accordance with the present invention which is capable of transmitting multiple channels of additional information in the available time slots of the horizontal blanking interval.

FIG. 2 shows a block diagram of a transmitter in accordance with the present invention which is capable of transmitting the TV information as well as 38 channels of sound. The input waveform, which is the same as that indicated in waveform a of FIG. 1A, appears at terminal 10 and is applied through a delay means 20 to the TV–PCM circuitry 26. The input waveform may be derived from a conventional interlaced video scanning system. TV–PCM circuitry is well known in the art and therefore the details of block 26 will not be described herein. Conventional TV–PCM systems sample the video in response to sampling pulses applied thereto and provide PAM (pulse amplitude modulated) pulses. Each PAM pulse is digitally encoded into a digital word representing the pulse amplitude. In the specific embodiment described herein, it is assumed that each sample is encoded into an eight bit word.

The input waveform is also applied to a sync and equalizing pulse extractor 12, of the type well known in the art, which operates to block the color burst and video signals from the input wave train and pass the equalizing pulses, horizontal sync pulses, and vertical sync pulses to its output terminal. The output from the sync and equalizing pulse extractor 12 will be the same as the waveform shown in waveform a of FIG. 1A with the exception that the video and color burst signals will have been removed.

The pulses out of the sync and equalizing pulse extractor 12 are then applied to a sync and equalizing pulse timing generator 14, which will be explained in more detail hereafter. The function of the sync and equalizing pulse timing generator is to provide output spikes (very narrow pulses) corresponding to the input pulses. The outputs appear on three different leads, one providing the horizontal spikes corresponding to the horizontal sync pulses, the second providing vertical spikes corresponding to the vertical sync pulses and the third providing equalizing spikes corresponding to the equalizing pulses. The spikes are delayed a preset amount of time with respect to the leading edge of the sync and equalizing pulses respectively. As will be explained in more detail in connection with FIG. 3, the delay is necessary to allow the generator 14 to make a decision concerning the particular type of pulse applied at the input.

The horizontal, vertical, and equalizing spikes from the timing generator 14, are applied to a timing circuit 16 which will be described in more detail in connection with FIG. 4. The purpose of the timing circuit 16 is to control the time at which TV data, unique words identifying the sync and equalizing pulses, and voice data are transmitted. The timing circuit 16 sends sampling pulses via lead 29 and clock pulses via lead 31 to the TV–PCM circuitry 26. The timing circuit 16 also sends clock pulses via lead 17 and a reset pulse via lead 19 to the horizontal unique word generator 18; clock pulses via lead 21 and a reset pulse via lead 23 to the vertical unique word generator 22; clock pulses via lead 25 and a reset pulse via lead 27 to the equalizing unique word generator 24; and read-out clock pulses via lead 33 to a memory unit 30. Following each input spike to the timing circuit 16, the timing circuit provides 60 clock pulses to the corresponding unique word generator which operates to provide a 60 bit word representing the horizontal sync pulse, the vertical sync pulse, or the equalizing pulse, as the case may be.

The 38 sound channels which, for example, may be the outputs of 38 microphones, are applied via 38 inputs, labeled 49 in the drawing, to the voice PCM circuit 28. The function of the voice PCM circuit is to time multiplex the 38 channels, sample the sound signals within each channel, and convert each sample into an eight bit word which is then passed to a memory 30 for brief storage therein. The purpose of memory 30 is to compress the digitally encoded sound data at the output of the voice PCM circuitry 28. Compression is accomplished by writing data into memory 30 at a relatively slow bit rate and reading the data out of the memory at a relatively fast bit rate. The read-out of the memory 30 is controlled by read-out clock pulses from the timing circuit 16.

The digital data outputs from the TV–PCM circuitry 26, the unique word generators 18, 22, and 24, and the memory 30, are all passed through a combiner 32 to a PSK modulator 34 whose output modulates the radio frequency transmitter 36. The combiner, PSK modulator and RF transmitter are well known units and therefore will not be illustrated in detail. As an example, the combiner may be any type of OR network which has a plurality of inputs and a single output lead. The PSK (phase shift key) modulator is merely a circuit which converts the digital bits into a phase code. For example, a sequence of 1 bits would cause the output frequency of the PSK modulator to have 0° phase whereas a sequence of 0 bits would cause the output of the PSK modulator to be at the same frequency but 180° out of phase.

Figure 3:
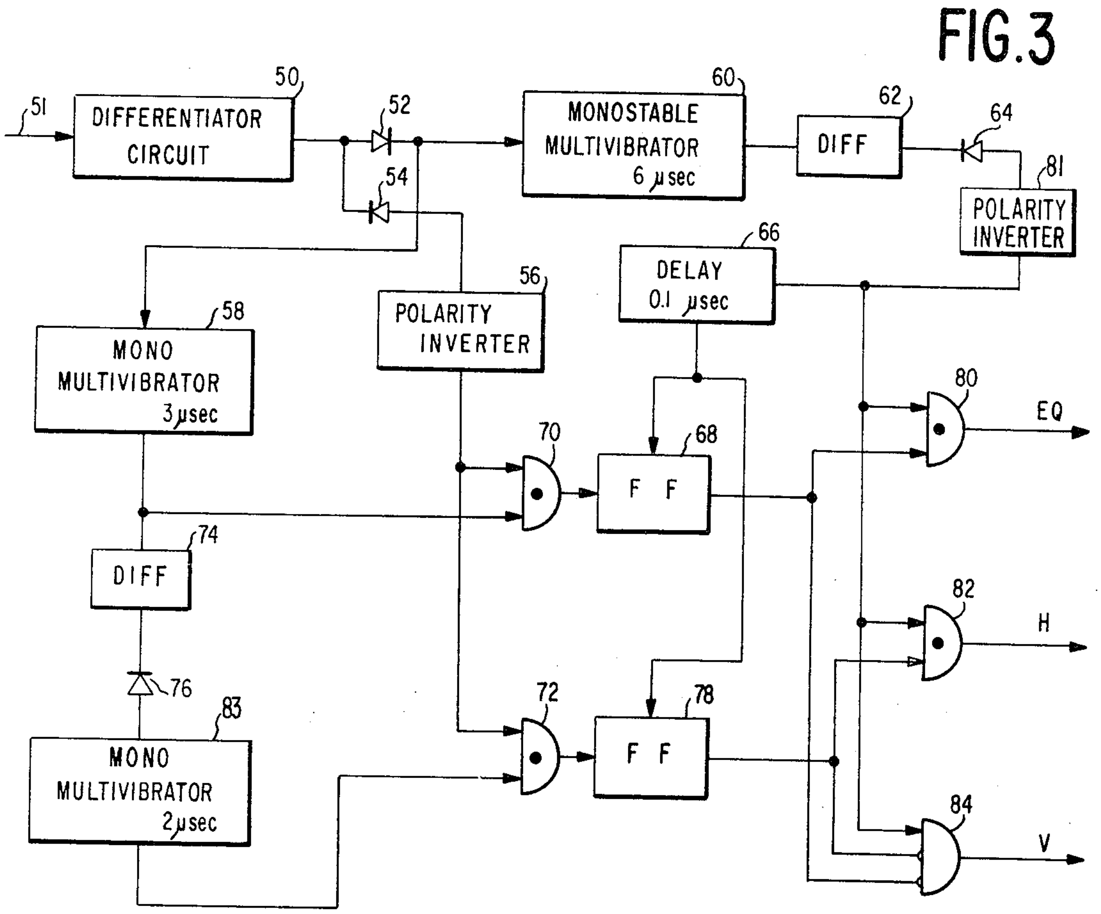
FIG. 3 is a block diagram of a pulse timing generator which may be used in the transmitter of FIG. 2.

FIG. 3 illustrates one preferred system which may be used as the sync and equalizing pulse timing generator 14 of FIG. 2. As stated above, the purpose of the timing generator 14 is to provide output spikes on three different output lines corresponding to the equalizing, horizontal, and vertical sync pulse inputs. As shown in FIG. 3, the output from the sync and equalizing pulse extractor 12 of FIG. 2 is applied via lead 51 to a differentiator circuit 50 which operates in a well known manner to differentiate the input pulses causing positive spikes in time coincidence with the leading edge of each input pulse and negative spikes in time coincidence with the trailing edge of each input pulse. The output from differentiator 50 is illustrated in waveform *b* of FIG. 1A. Since the horizontal sync pulses, vertical sync pulses, and equalizing pulses have different widths, the positive and negative spikes in coincidence with the leading and trailing edges of the input pulses will be separated by different distances depending upon whether the input is a horizontal sync pulse, a vertical sync pulse, or an equalizing pulse.

The positive spikes are passed through a diode 52 to a monostable multivibrator 58 which provides a 3 microsecond pulse at its output terminal in response to each spike input. It will be noted that the 3 microsecond time is greater than the equalizing pulse width but less than the horizontal sync pulse width and the vertical sync pulse width. The 3 microsecond pulse is applied as one input to AND gate 70. The other input to AND gate 70 is derived from the negative spikes out of differentiator 50 which are passed through diode 54 to a polarity inverter 56 and then to the AND gate 70. The output of AND gate 70 sets flip-flop 68. As a result of the timing sequence, the spikes corresponding to the trailing edges of every pulse will be applied to the upper input of AND gate 70, but only those spikes corresponding to the trailing edge of the equalizing pulses will be passed through AND gate 70 to set flip-flop 68. Thus, flip-flop 68 will always be set when an equalizing pulse is received.

The 3 microsecond square wave pulse out of monostable multivibrator 58 is also passed through a differentiator 74 which provides another pair of leading and trailing edge spikes, the latter of which is passed through diode 76 to trigger a 2 microsecond monostable multivibrator 83. A polarity inverter may be placed between diode 76 and multivibrator 83 or multivibrator 83 may be one which is triggered by negative input pulses. The 2 microsecond pulse at the output of monostable multivibrator 83 is applied to the lower input of AND gate 72 thereby allowing spikes only resulting from the trailing edges of the horizontal sync pulses to pass through AND gate 72 and set flip-flop 78. If a vertical sync pulse is received at the input to differentiator 50, neither flip-flop 68 nor flip-flop 78 will be set.

The positive spikes out of differentiator 50, corresponding to the leading edges of all of the input pulses, are also applied to the triggering input of a six microsecond monostable multivibrator 60 whose 6 microsecond pulse output is applied through a differentiator 62 to a diode 64. The diode 64 will pass only the spikes corresponding to the lagging edge of the 6 microsecond output pulse. The latter spikes are applied to a polarity inverter 81 and then to the upper inputs of AND gates 80 and 82 and the upper input of inhibit gate 84. Thus, 6 microseconds after the reception of any input pulse to the differentiator circuit 50, a spike will be passed through one of the gates 80, 82, and 84, depending upon the condition of flip-flops 68 and 78. If the received pulse was an equalizing pulse, flip-flop 68 will be set causing an output from AND gate 80. If the input is a horizontal sync pulse, flip-flop 78 will be set, causing an output from AND gate 82. With either of the flip-flops set, the inhibit gate 84 is inhibited thereby preventing a spike at the upper input of inhibit gate 84 from passing to the output thereof. However, if neither flip-flop 68 nor flip-flop 78 is set, a condition occurring when the input pulse is a vertical sync pulse, the spike passing through diode 64 will also pass through gate 84 to the vertical spike output lead. An illustration of the equalizing, horizontal, and vertical spike outputs from the sync and equalizing pulse timing generator of FIG. 3 is illustrated in waveforms c, d and e of FIG. 1A, respectively. The negative spike passing through diode 64 is also applied to a delay means such as delay line 66 to provide a reset input to flip-flops 68 and 78 a short time (0.1 sec.) after the passage of a spike through one of the gates 80, 82 or 84.

Figures 4, 4A:
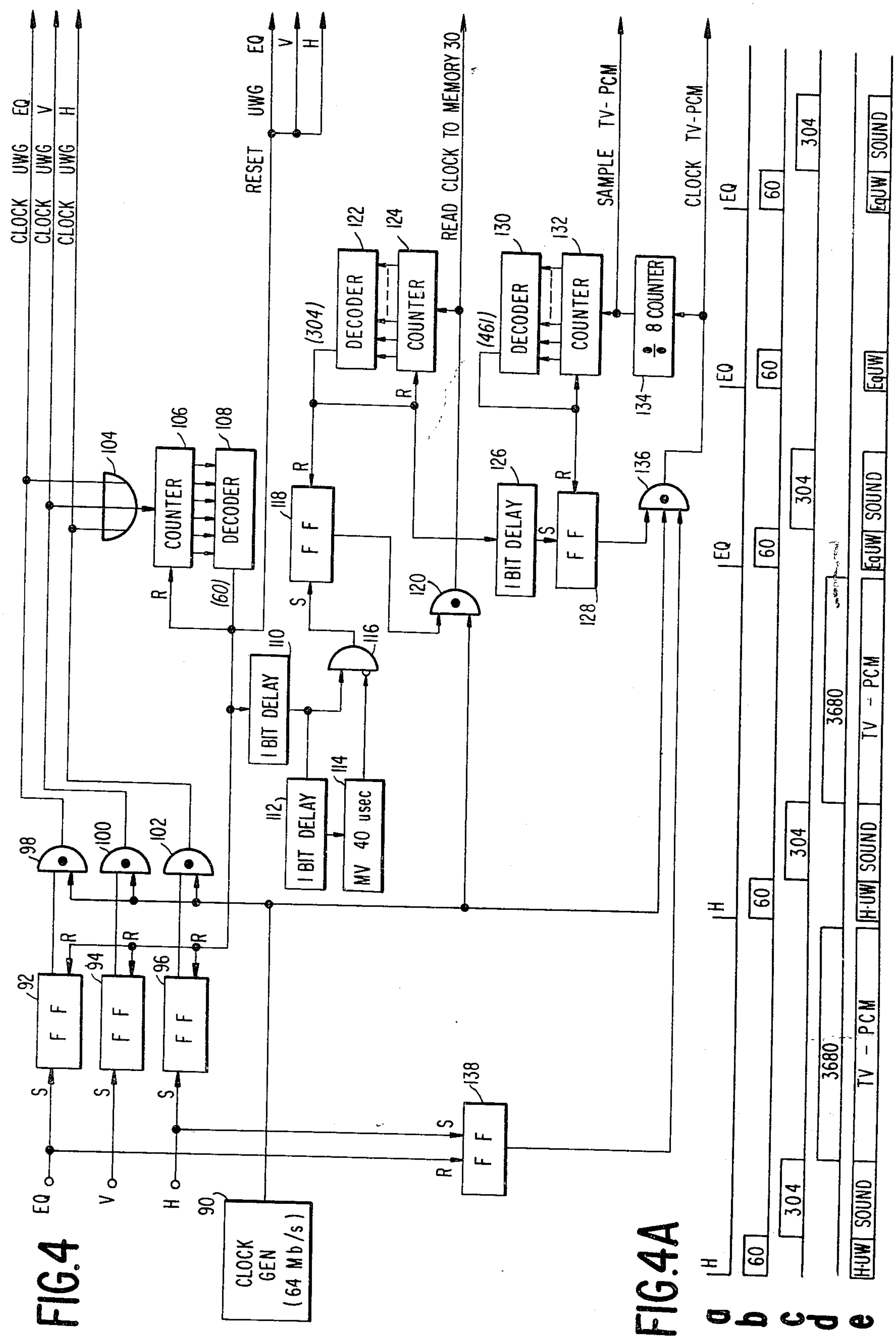
FIG. 4 is a block diagram of a timing circuit which may be used in the transmitter of FIG. 2 for controlling the time slots in which different types of information are transmitted.
FIG. 4a is a timing diagram which illustrates the time sequence of certain events which occur in the transmitter.

The equalizing, horizontal and vertical spikes are applied to the timing circuit 16, which is illustrated in detail in FIG. 4. As mentioned above, the purpose of the timing circuit is to provide clock pulses to the TV–PCM circuitry 26, the unique word generators 18, 22 and 24 and the memory 30 at special times to control the arrangement of digital data which is transmitted.

The input equalizing, vertical and horizontal spikes from timing generator 14 set the respective flip-flops 92, 94 and 96 which in turn enable the respective AND gates 98, 100 and 102, to pass clock pulses from clock generator 90 to one of the unique word generators 18, 22 and 24. For example, an equalizing spike sets flip-flop 92 which in turn energizes AND gate 98 to pass clock pulses through AND gate 98 to the unique word generator 24 for equalizing pulses. Thus, in response to each spike applied to the timing circuit 16, the corresponding unique word generator receives a group of clock pulses.

Since each unique word is 60 bits long, only 60 clock pulses are sent to the unique word generator following an input spike. The 60 bit clock groups are controlled by the OR gate 104, the counter 106, and decoder 108. The counter 106 may be a binary counter which has sufficient stages to count up to 60, and the decoder 108 may be any type of decoder e.g., a simple diode AND network, which responds to a binary count of 60 in counter 106 to provide an output therefrom. Thus, the combination of the counter and decoder provides an output reset pulse following the 60th clock pulse passed through any one of the AND gates 98, 100 and 102. The reset pulse resets the flip-flop which was previously set by an input spike and also resets counter 106. Thus, following each equalizing spike there will be 60 clock pulses sent to the equalizing pulse unique word generator; following each vertical spike there will be 60 clock pulses sent to the vertical sync pulse unique word generator; and following each horizontal spike there will be 60 clock pulses sent to the horizontal sync pulse unique word generator. It should be noted that at the 64 megabit/sec rate given in the specific example, each of the 60 bit groups occupies less than the 1.27 microsecond "front porch" time. The reset output from decoder 108 is also sent to the reset input terminals of the three unique word generators 18, 22, and 24 shown in FIG. 2.

The timing circuit also sends out groups of 304 clock pulses to the read clock terminal of the memory 30, illustrated in FIG. 2. The 304 clock pulse group will be sufficient to read out 38 eight bit words corresponding to one sample from each of the sound channels. The 304 clock pulse group follows each 60 clock pulse group sent to the horizontal pulse unique word generator and every other 60 clock pulse group sent to the equalizing and vertical unique word generators. The circuitry of FIG. 4 for generating the 304 clock pulse groups at the proper times will now be described.

Each reset output pulse from the decoder 108 is applied through a one bit delay circuit 110 to the input of an inhibit gate 116. As long as there is no input applied to the lower input of inhibit gate 116, the reset pulses after being delayed will pass through inhibit gate 116 and set flip-flop 118. The output from the 1 bit delay 110 is also sent through a second one bit delay, 112, to the triggering terminal of a 40 microsecond multivibrator 114. The 40 microsecond output pulse from the multivibrator is applied to the inhibit terminal of inhibit gate 116 and thus prevents any reset pulse from passing through gate 116 for 40 microseconds.

The purpose of the circuitry just described is to allow every reset pulse following the horizontal spikes to pass through gate 116 to set flip-flop 118 but to allow only every other reset pulse following the vertical and equalizing spikes to pass through gate 116. As mentioned above, the horizontal line time, which is also the time between horizontal sync pulses, is $1/(15.75 \times 10^{-3})$ microseconds, which is greater than 40 microseconds. Thus, each succeeding reset pulse corresponding to the horizontal spikes will occur after the 40 microsecond inhibiting pulse has terminated. However, the time between adjacent equalizing pulses and adjacent vertical sync pulses is equal to H/2, which is less than 40 microseconds, and therefore every other reset pulse corresponding to the equalizing and vertical spikes will be inhibited by the 40 microsecond inhibiting pulse.

When flip-flop 118 is set, it energizes AND gate 120 thereby allowing clock pulses from clock generator 90 to pass through AND gate 120 to the read input of the memory 30. The counter 124 and decoder 122 operate to control the number of clock pulses sent to the memory. The counter decoder arrangement is the same as the counter 106 decoder 108 arrangement described previously with the exception that counter 124 has a sufficient number of stages to count up to 304, and decoder 122 responds to a binary count of 304 to provide a reset output pulse. The reset output pulse resets counter 124 and flip-flop 118. Thus, each time flip-flop 118 is set, a group of 304 clock pulses will be sent to the read terminal of memory 30.

The timing circuit of FIG. 4 also provides sampling pulses and clock pulses to the TV–PCM circuitry which controls the TV–PCM circuitry in a well known manner to sample and encode the input video applied thereto. The sampling and clock pulses sent to the TV–PCM circuitry follow in time the 304 clock pulse group which is sent to memory 30. The reset pulse from decoder 122 passes through a one bit delay circuit 126 and sets flip-flop 128. When flip-flop 128 is set, it energizes the upper input of AND gate 136 thereby allowing clock pulses from clock generator 90 to pass through AND gate 136 to the clock input terminal of the TV–PCM circuitry. The clock pulses are also applied to a divide by 8 counter, 134, which provides an output pulse in response to the first input clock pulse and every 8 clock pulses thereafter. The output pulses from counter 134 are sent to the sample input terminal of the TV–PCM circuitry 26. As mentioned above, for the specific example described herein, there are 460 samples of the video for each horizontal line, and therefore there are 3,680 bits coming out of the TV–PCM circuitry for each horizontal line. The number of clock pulses and sample pulses sent to the TV–PCM circuitry is controlled by the counter 132 and decoder 130. The counter decoder combination is the same as the counter 106 decoder 108 combination described above with the exception that the counter 132 is capable of counting up to 461 and the decoder 130 provides a reset output pulse in response to the count 461. The reason why the decoder 130 is set to respond to the count of 461, whereas only 460 sample pulses are needed, is because the divide by 8 counter 134 provides the first sample pulse output in response to the first clock pulse input thereto and thus, after the 460th sample pulse is received by counter 132 it is still necessary to send an additional 7 clock pulses to the clock input of the TV–PCM circuitry. By setting the decoder to respond to the count of 461, the AND gate 136 is energized for the additional time necessary to transmit the clock pulses necessary to encode the last sampled video.

Although the reset pulse from decoder 122 operates to set flip-flop 128 one bit time following every group of 304 clock pulses sent to memory 30, the timing circuit does not send a group of 3,680 clock pulses to the TV–PCM circuitry following every group of 304 clock pulses. The 3,680 group of clock pulses is sent out only following horizontal sync pulses but never following equalizing or vertical sync pulses. This is accomplished by a flip-flop 138 which is set by horizontal spikes and reset by the first equalizing spike into the timing circuit following the horizontal spikes.

The time relationship of the output clock pulses from the timing circuit is illustrated by the timing diagrams of FIG. **4*a***. Waveform (*a*) illustrates timing relationship of the incoming spikes applied to the timing circuit. The first two spikes represent horizontal spikes and the other three spikes represent equalizing spikes. Vertical spikes are not shown but the overall timing relationship will be the same as that for the equalizing pulse spikes. Waveform (*b*) illustrates the time during which clock pulses are sent to the unique word generators. It will be noted that following each horizontal spike the 60 clock bits are sent only to the horizontal unique word generator and following each equalizing spike the 60 clock pulses are sent only to the equalizing unique word generator. Waveform (*c*) illustrates the time during which each group of 304 clock pulses are sent to the read terminal of memory 30. It will be noted that the 304 clock pulses follow every horizontal spike and every other equalizing and vertical spike. This is necessary in order to maintain periodic read-out from the memory. Waveform (*d*) illustrates the time during which the groups of 3,680 clock pulses and also 460 sample pulses are sent to the TV–PCM circuitry. As can be readily seen from the timing diagrams, for the specific embodiment described herein, there will be 4,044 clock pulses sent out from the timing generator following each horizontal spike. That is slightly less than the number of clock pulses occuring during each horizontal line. It will be readily apparent to anyone having ordinary skill in the art that for the given horizontal time period, an increased clock rate could accommodate more than the 38 sound channels described herein, and a decreased clock rate would accommodate less than the 38 channels described herein.

Referring back to FIG. 2, it can be seen that each group of 60 clock pulses from the timing circuit 16 is sent to one of the unique word generators 18, 22, and 24. The unique word generators may be any type of coding devices which operate in response to the 60 clock pulses to provide a 60 bit output word that is unique for the particular generator. Each generator is capable of generating a single word, and the unique words provided by the three generators differ from one another.

Figure 5:
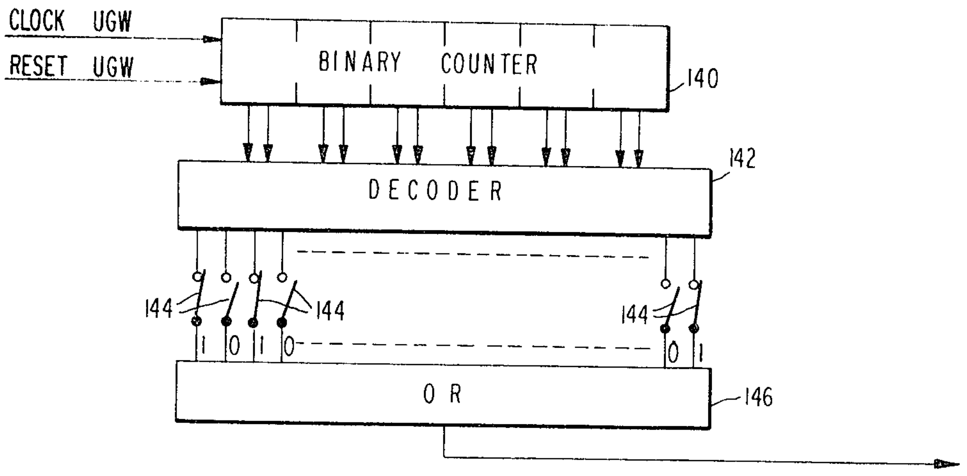
FIG. 5 is a block diagram of a code word generator that may be used in the transmitter of FIG. 2.

One particular form of unique word generator which may be used is illustrated in FIG. 5 and comprises a binary counter 140, a decoder 142, a bank of manual switches 144, and an OR gate 146. The binary counter 140 must be capable of counting at least up to the number of bits in the unique word, which in the specific example described herein is 60 bits. The binary counter accumulates the 60 input clock pulses and is then reset by the reset output from the decoder 108 (FIG. 4) of the timing circuit. The 0 and 1 conditions of each stage of the counter 140 are sensed by a decoder 142 which may be a 12 × 60 diode matrix decoder of a type well known in the prior art. The decoder is arranged so that there is an output pulse on the first output lead when the binary counter registers a count of 1; an output pulse on the second output lead when the counter registers a count of 2, and so on until a pulse appears on the 60th output lead when the binary counter registers a count of 60. The particular coded form of the unique word is determined by the setting of the manual switches which, when closed, connect the corresponding output terminal from the decoder to the OR gate 146. For example, when the first clock pulse is received, the output pulse on the first output terminal of the decoder will pass through the closed manual switch resulting in a binary 1 output from the OR gate; when the second clock pulse is received the output pulse on the second output lead of the decoder will not pass to the OR gate because the second manual switch is open, thereby resulting in a binary 0 output from the OR gate in coincidence with the second clock time. The only difference between the horizontal, vertical, and equalizing unique word generators is the settings of the manual switches 144.

Figure 6:
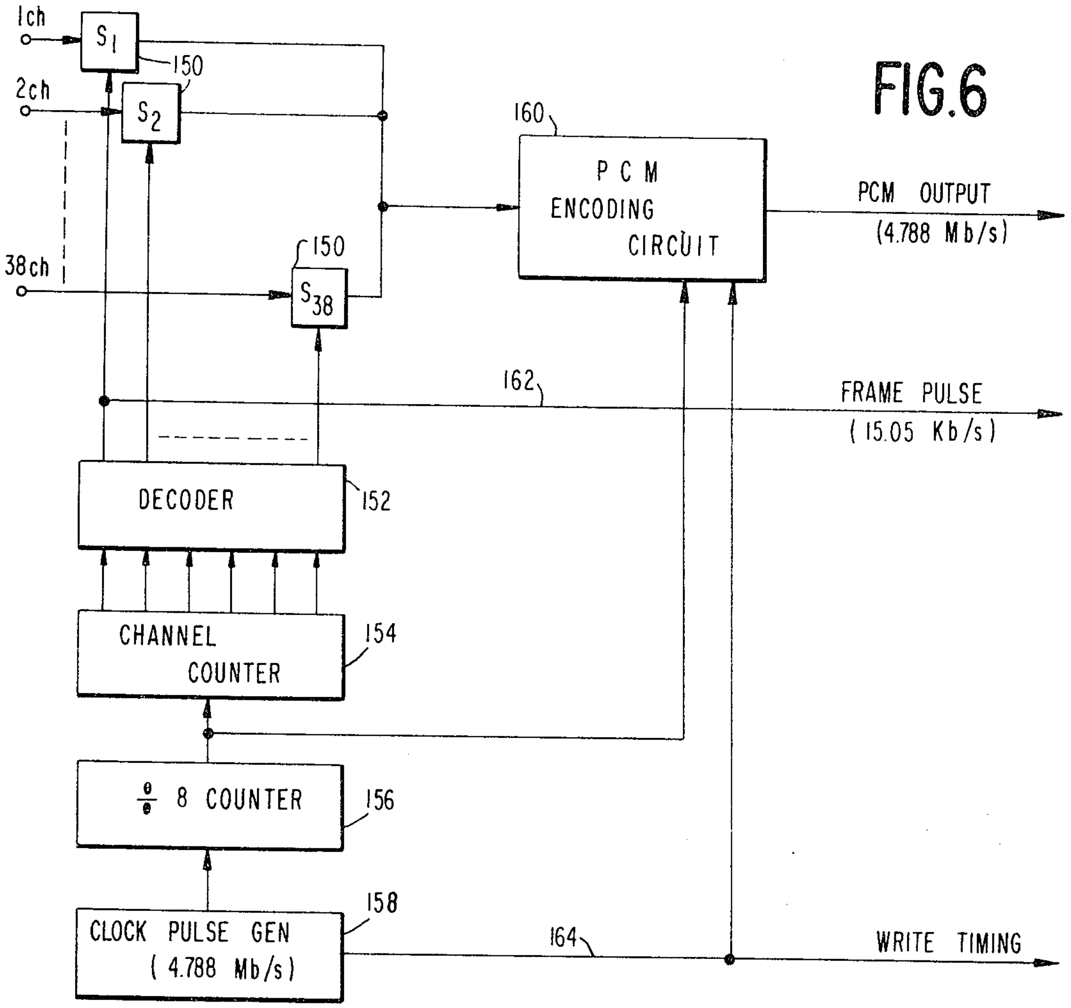
FIG. 6 is a block diagram of a typical voice PCM and multiplexing system which may be used in the transmitter of FIG. 2.

FIG. 6 illustrates one example of the voice PCM circuit 28 of FIG. 2. The 38 sound channels are applied in parallel to 38 sampling circuits 150 which respond in sequence to the sampling pulse outputs from a decoder 152 to sample the voice signals on the respective channels. A complete cycle of 38 samples, one for each sound channel, will be referred to herein as a voice frame. A clock pulse generator 158 provides clock pulses at a rate of 4.788 megabits per second to a divide by 8 counter 156. The divide by 8 counter provides sampling pulses at its output which are applied to a channel counter 154 whose output in turn is sensed by the decoder 152. The channel counter 154 recycles at the count of 38. The decoder 152, which may be a conventional diode matrix decoder, provides sampling outputs in sequence on its 38 output leads, each in response to a different count registered in the channel counter 154. The outputs from the sampling circuits 150 are amplitude modulated pulses, as is well known in the prior art, and those pulses as they occur are sent to the PCM encoding circuit 160 which is operable to encode each amplitude modulated pulse into an 8 bit output word at a clock rate of 4.788 megabits per second. PCM encoding circuits are known in the art and thus will not be described in any further detail herein. The first output of decoder 152, which is used to sample the first sampling circuit 150, is also brought out of the system via lead 162. The pulses on lead 162 define the beginning of each voice frame and are used in the memory 30 (FIG. 2) described more fully hereinafter. The voice clock pulses from clock pulse generator 158 are also brought out of the system via lead 164 and sent to the write timing input of the memory.

Figure 7:
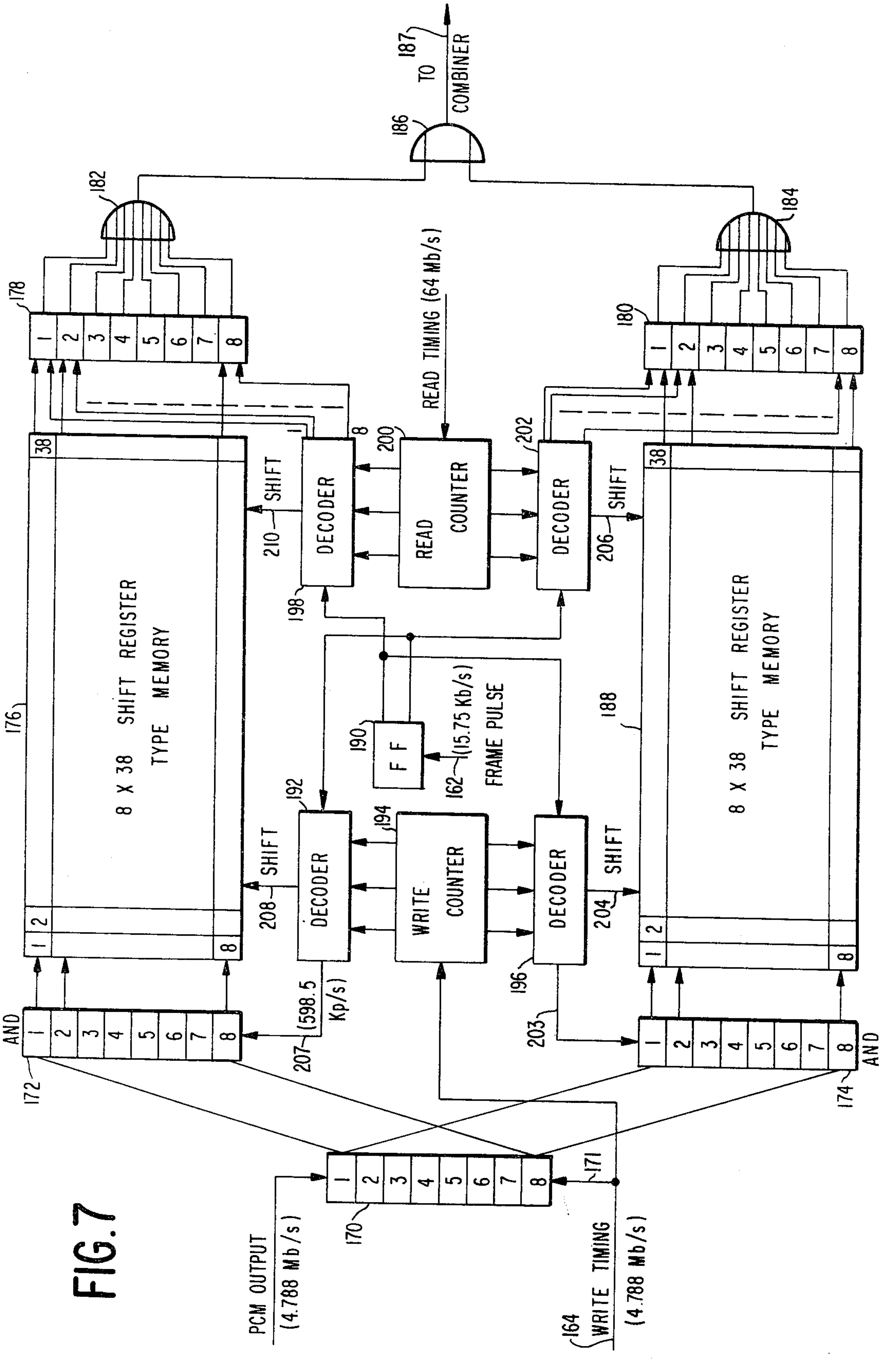
FIG. 7 is a block diagram of a preferred embodiment of a bit rate converter in accordance with the present invention.

An example of the memory 30, which is illustrated in block diagram form in FIG. 7, receives the PCM encoded voice output from the voice PCM encoding circuit 160 (FIG. 6) at the voice clock rate of 4.788 megabits per second and transmits the PCM voice information to the combiner 32 (FIG. 2) at the transmission clock rate of 64 megabits per second. The memory 30 comprises a pair of 8 × 38 shift register type memories 176 and 188. The two memories are identical, and control circuitry adapts one memory to receive information while the other is being read out and switches the function of the two memories in response to each frame pulse from the voice PCM circuitry illustrated in FIG. 6. Each of the shift register type memories has 38 word columns with each word columns having an 8 bit capacity. Thus, each of the memories can store the complete voice PCM data generated during a single voice frame. In response to each shift pulse, the entire contents of the memory is shifted one column position to the right.

In operation, the PCM output from the voice PCM encoder 160 of FIG. 6 is applied to an eight stage shift register 170 which is shifted in response to the voice clock pulses received at the Write Timing input terminal 171. The voice clock pulses are received via lead line 164 from the clock pulse generator 158 of FIG. 6. The voice clock pulses are also accumulated by a write counter 194 which counts eight input pulses, corresponding to a voice word, and then recycles. The count presently in the write counter 194 is sensed by a pair of decoders 192 and 196, only one of which is conditioned at any one time. The particular decoder which is conditioned is determined by the output of flip-flop 190. Flip-flop 190 receives the voice frame pulses via lead line 162 from the decoder 152 of FIG. 6. In response to each frame pulse applied thereto, flip-flop 190 reverses the condition of the energizing voltages on its output leads.

The decoder 192 which may be an AND gate responds to a binary 8 condition in the write counter 194 by providing an output gating pulse on lead 207 and an output shift pulse on lead 208. The shift output on lead 208 shifts the entire contents of memory 176 one column position to the right, and at the same time the gating output on lead 207 enables a bank of eight AND gates 172 to pass the contents of shift register 170 into the first column of memory 176. Thus, it can be seen that the eight bit PCM encoded voice words are entered serially into shift register 170 and then in parallel into memory 176. At the end of the voice frame period an entire frame of voice data from the PCM encoding circuit 160 (FIG. 6) will be stored in the memory 176 with the first eight bit word being stored in the 38th column, the second eight bit word being stored in the 37th column and so on. The next voice frame pulse on lead 162 toggles flip-flop 190 causing decoder 196 to be enabled and decoder 192 to be disabled. Decoder 196 operates in the same manner as decoder 192 to provide shift pulses on lead 204 and gating pulses on lead 203. As a result, the next 38 words out of the PCM encoding circuit will be entered into memory 188 via shift register 170 and a bank of AND gates 174.

The outputs from flip-flop 190 also control the enabling of a second pair of decoders 198 and 202. The outputs are arranged so that decoder 202 is enabled at the same time decoder 192 is enabled, and decoder 198 is enabled at the same time decoder 196 is enabled. Decoder 198 allows memory 176 to be read out and decoder 202 allows memory 188 to be read out. Assuming now that memory 176 has been filled, and information is presently being read into memory 188, the decoder 198 will be conditioned and memory 176 is ready for read-out.

Read counter 200 may be identical to write counter 194 in that it is capable of accumulating eight input pulses and recycling after reaching a count of eight. The decoders 198 and 202 may be matrix decoders each having eight outputs responding respectively to the counts of 1 through 8 in the read counter 200. The eight outputs from decoders 198 and 202 are applied in sequence to banks of eight AND gates 178 and 180, respectively which pass the word appearing in the 38th column of memories 176 and 188, respectively to the output lead 187 via OR gates 182 and 184, respectively, and 186. The 8th output lead of the decoders 198 and 202 may also be applied to the shift input terminals 210 and 206 respectively of memories 176 and 188 respectively thereby shifting the contents of the memory one column position to the right as the eighth bit of the word in the 38th column is being read out. Thus, from the circuitry shown, it can be seen that the 304 clock bits at the 64 megabit per second rate from the timing circuit 16 (FIG. 2) completely reads out the contents of memory 176 while data is being written into memory unit 188. When the next frame pulse arrives, the memory 176 will again receive data and memory 188 will be read out by the next group of 304 clock bits. It should be noted that the 304 clock bits at the high clock rate occupy much less time than a voice frame, and therefore the memory which is being read out is completely read out while the alternate memory is still receiving input data. Also, it should be noted that the voice frame rate is the same as the horizontal sync pulse rate, so consequently there will be one 304 clock pulse group corresponding to each voice frame.

Referring back to FIG. 2, the delay circuit 20 can now be explained. The purpose of the delay is to place the picture information in coincidence with the 3,680 group of clock pulses sent to the TV–PCM circuitry. The actual time of the delay depends upon the frequencies of signals used and other constants. For the particular constants used in the example, the time of the delay can be understood by referring to waveforms (*a*) and (*b*) of FIG. 1B.

In waveform (*a*), the distance H represents one horizontal line, H equals 63,492 microseconds and at the 64 megabit/sec. clock rate occupies approximately 4,063 clock pulse periods. The horizontal line includes a 1.27 microsecond "front porch," a 4.75 microsecond horizontal sync pulse, followed by picture information which includes a color burst plus kinescopic information or kinescopic information alone.

The picture information is the information which is encoded by the TV–PCM circuitry, and in the present example has a length equal to approximately 3,680 clock pulse periods. Within each horizontal line time there is a 6.02 microsecond (1.27 + 4.75) slot in which a unique word and additional data may be transmitted. This slot occupies approximately 383 clock pulse periods.

Waveform (*b*) represents the time relationship of the clock pulse groups generated by the timing circuit 16 (FIG. 2) in response to the horizontal sync pulse of waveform (*a*). The horizontal spike 201 generated in response to the horizontal sync pulse is delayed 6 microseconds from the leading edge of the horizontal sync pulse as explained above in connection with FIG. 3. The spike 201 starts the timing of the 60 clock pulses sent to the horizontal unique word generator 18. That is followed directly by 304 clock pulses sent to the read terminal input of the memory 30 which is followed directly by the 3,680 clock pulses sent to the TV–PCM circuit 26. Thus, although 383 clock pulse periods are available for the unique word plus the additional data, only 364 clock periods are used leaving a few clock periods of the horizontal line time unused. It is apparent from the waveforms that the delay of delay means 20 must be equal to the amount indicated by the word "DELAY" in waveform (*b*). The time in microseconds or clock pulse periods is easily calculated for any given set of frequencies, periods, line lengths, etc.

Although the embodiment illustrated by FIGS. 2 through 7 has been described for the case of sending out sound information during the available periods of a TV–PCM transmission system, it will be apparent to anyone having ordinary skill in the art that other types of data instead of sound or in addition to sound information may be sent out during the available times. The only requirement is that the information be of a type which can be converted into digital form.

Figure 8:
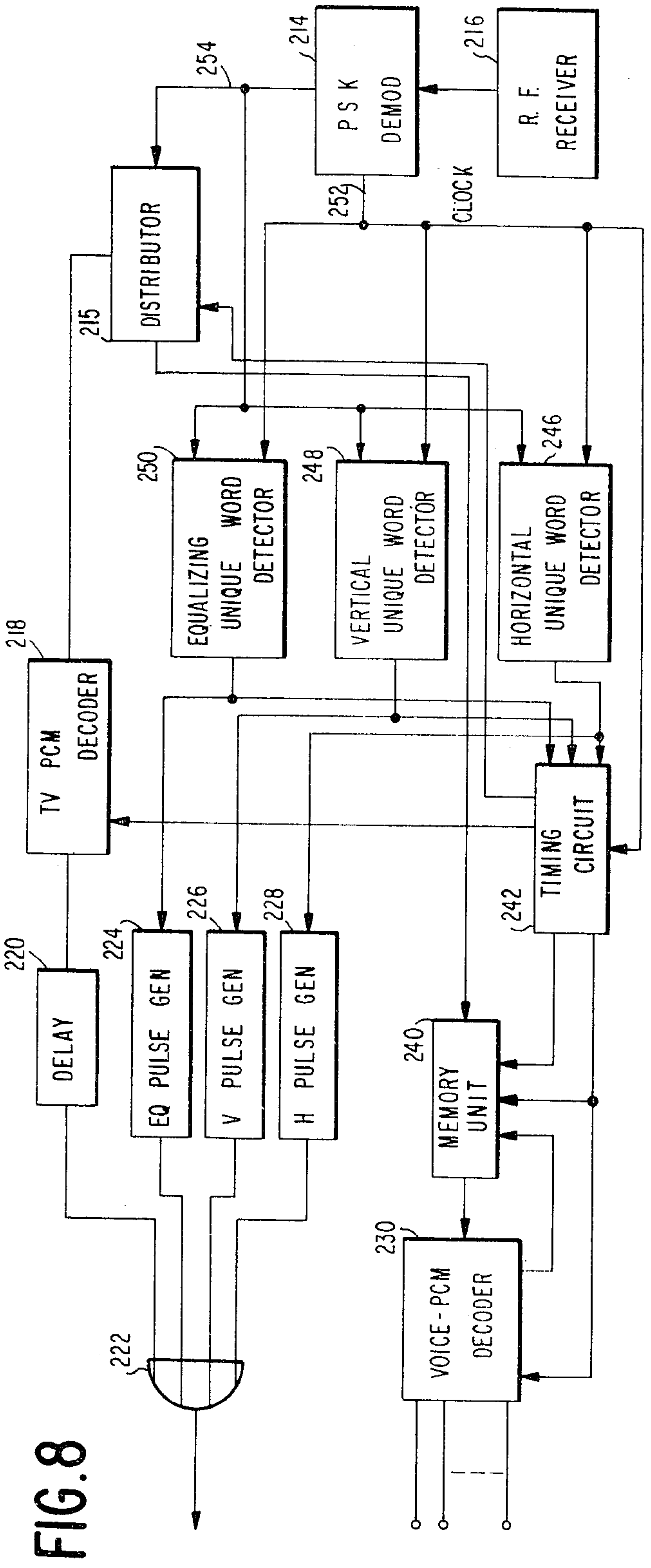
FIG. 8 is a block diagram of a receiver which is adapted to receive the information transmitted by the transmitter of FIG. 2.

A block diagram of one preferred embodiment of a receiver adapted to receive the signal transmitted by the transmitter of FIG. 2, is illustrated in FIG. 8. The incoming signal is passed through the radio frequency receiver 216 and the PSK demodulator 214, both of which are conventional circuits and well known in the prior art. The PSK demodulator 214 operates to provide clock pulses at the incoming bit rate on lead 252 and provides the digital information at its output lead 254. The format of the information output on lead 254 will be exactly as illustrated in waveform (*e*) of FIG. 4A. The information on lead 254 is connected to a distributor 215, and three unique word detectors, 250, 248 and 246. The unique word detectors also receive clock pulses on lead 252. Each of the unique word detectors is a decoder which responds to the equalizing, vertical, or horizontal unique words, respectively, to provide a narrow output pulse indicating the presence of such unique words in the received signal. The output pulses from the unique word detectors are in time coincidence with the last bit of each unique word and are applied to a timing circuit 242 along with clock pulses via lead 252. The timing circuit 242 operates to control the timing and clocking of the remaining circuits in the receiver.

The timing circuit provides gating signals to the distributor 215 causing the distributor to send the received voice PCM data to a memory unit 240 and the TV–PCM data to the TV–PCM decoder 218. The timing circuit 242 also supplies clock pulses to the TV–PCM decoder 218 and memory 240, and voice frame pulses to memory unit 240 and voice PCM decoder 230. TV–PCM decoders are well known in the art and therefore the TV–PCM decoder 218 will not be described in any detail herein. The memory unit 240 operates to receive the voice PCM data at the 64 megabit per second clock rate and transfer the same data to the voice–PCM decoder at a 4.788 megabit per second clock rate. The memory unit 240 may be identical to the one used in the transmitter and shown in detail in FIG. 7. However, in the case of the receiver memory unit, 240, the write timing input will be clock pulses at a 64 megabit per second rate and the read timing input will be clock pulses at a 4.788 megabit per second rate.

The narrow pulses out of the unique word detectors, corresponding to the equalizing, vertical and horizontal spikes, are applied respectively to equalizing, vertical and horizontal pulse generators 224, 226 and 228. The pulse generators may be simple multivibrator circuits which provide output pulses of fixed duration in response to an input triggering spike. In the case of the equalizing pulse generator 224, the multivibrator would provide an output pulse of 2.4 microseconds in duration; the vertical pulse generator 226 would provide output pulses of 27 microseconds in duration; and the horizontal pulse generator 228 would provide output pulses of 4.75 microsecond duration. Thus, the outputs from the pulse generators 224, 226 and 228, are the reconstructed equalizing, vertical sync, and horizontal sync pulses, and they will have a time relationship identical to that illustrated in waveform (*a*) of FIG. 1A.

The reconstructed picture information at the output of the TV–PCM decoder 218 is delayed by delay circuit 220 to place the picture information at the proper time position with respect to the reconstructed horizontal sync pulses. The amount of the delay is a simple matter of calculation depending upon the frequencies, clock times, etc. used in the system. An illustration of the delay time can be seen by referring to waveform c of FIG. 1B. Waveform *c* represents the reconstructed horizontal sync pulse in time relation as shown referenced to received information indicated by waveform b of FIG. 1B. Since the spike output from equalizing unique word detector 250 occurs in coincidence with the 60th bit of the horizontal unique word, the 4.75 microsecond pulse generated by the horizontal pulse generator 228 also begins in time coincidence with the last bit of the horizontal unique word. Since 4.75 microseconds is greater than the 304 clock periods occupied by the voice data, the lagging edge of the reconstructed horizontal sync pulse is behind the start of the picture data. Therefore, it is necessary to provide a delay in the output of the TV–PCM decoder 218 which delays the picture information an amount which is the difference between 4.75 microseconds and 304 clock pulse periods. That delay is indicated by the word delay in waveform *c* of FIG. 1B. The output of delay circuit 220 as well as the reconstructed equalizing, vertical sync and horizontal sync pulses are applied through an OR gate 222 to an output terminal. Thus, the signal on the output terminal will be a complete reconstruction of the signal at the input terminal of the transmitter and as illustrated in waveform a of FIG. 1A. The output from memory unit 240 is applied to a voice–PCM decoder 230 which operates to decode the voice data into analog form and de-multiplex that data onto 38 output terminals representing the 38 sound channels originally coded.

Figure 9:
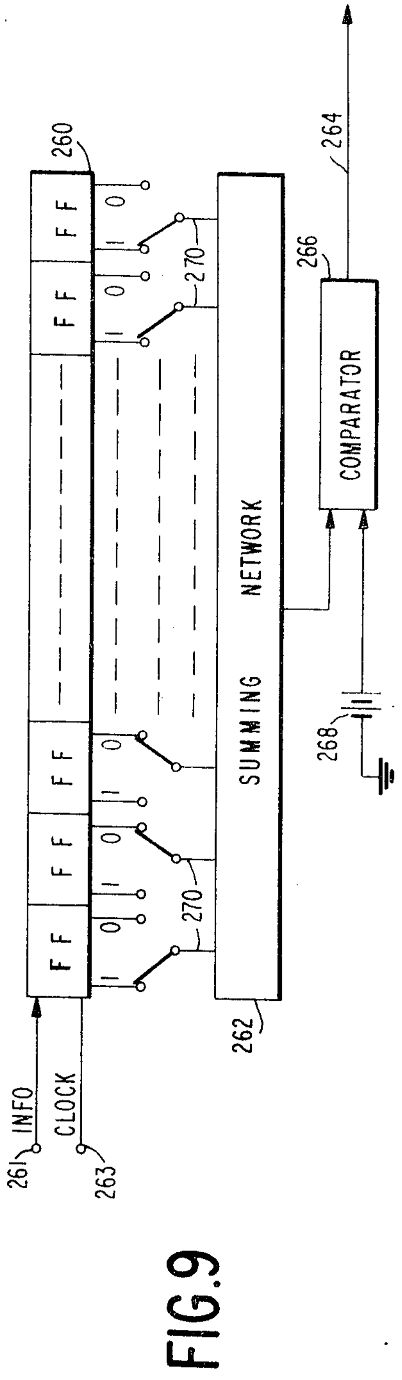
FIG. 9 is a block diagram of a decoder which is capable of detecting a code word generated by the generator shown in FIG. 5.

An example of one type of decoding network which may be used for the unique word detectors of the receiver is illustrated in FIG. 9 and comprises a 60 stage shift register 260, a plurality of manual switches 270, one for each stage of the shift register, a summing network 262, and a comparator 266. The detector is a typical correlation detector which operates to receive all of the incoming information at input 261. The incoming information is shifted through the stages of shift register 260 at the clock rate controlled by the 64 megabit/second clock pulses applied at input terminal 263. Each stage of the shift register has a pair of output terminals corresponding to the zero and 1 storage conditions of the particular stage. For example, when a flip-flop is registering a binary 0, the 1 output terminal will be de-energized and the 0 output terminal will be energized. One of every pair of output terminals from each flip-flop is connected via a manual switch to one of the input terminals 270 of the summing network 262. The output of the summing network is applied as one input to comparator 266, the other input being a predetermined threshhold voltage, indicated by battery 268. The manual switches are set so that when the unique word is fully shifted into the 60 stage shift register, every input terminal 270 of the summing network will be energized thereby providing a maximum output voltage therefrom which is applied to the upper input of comparator 266. The threshhold voltage may be set somewhat lower than this maximum voltage in order to provide an output spike on lead 264 even in those instances where there is a small number of bit errors in the unique word. The only difference between the equalizing, vertical and horizontal unique word detectors, is in the setting of the manual switches.

Figures 10, 11:
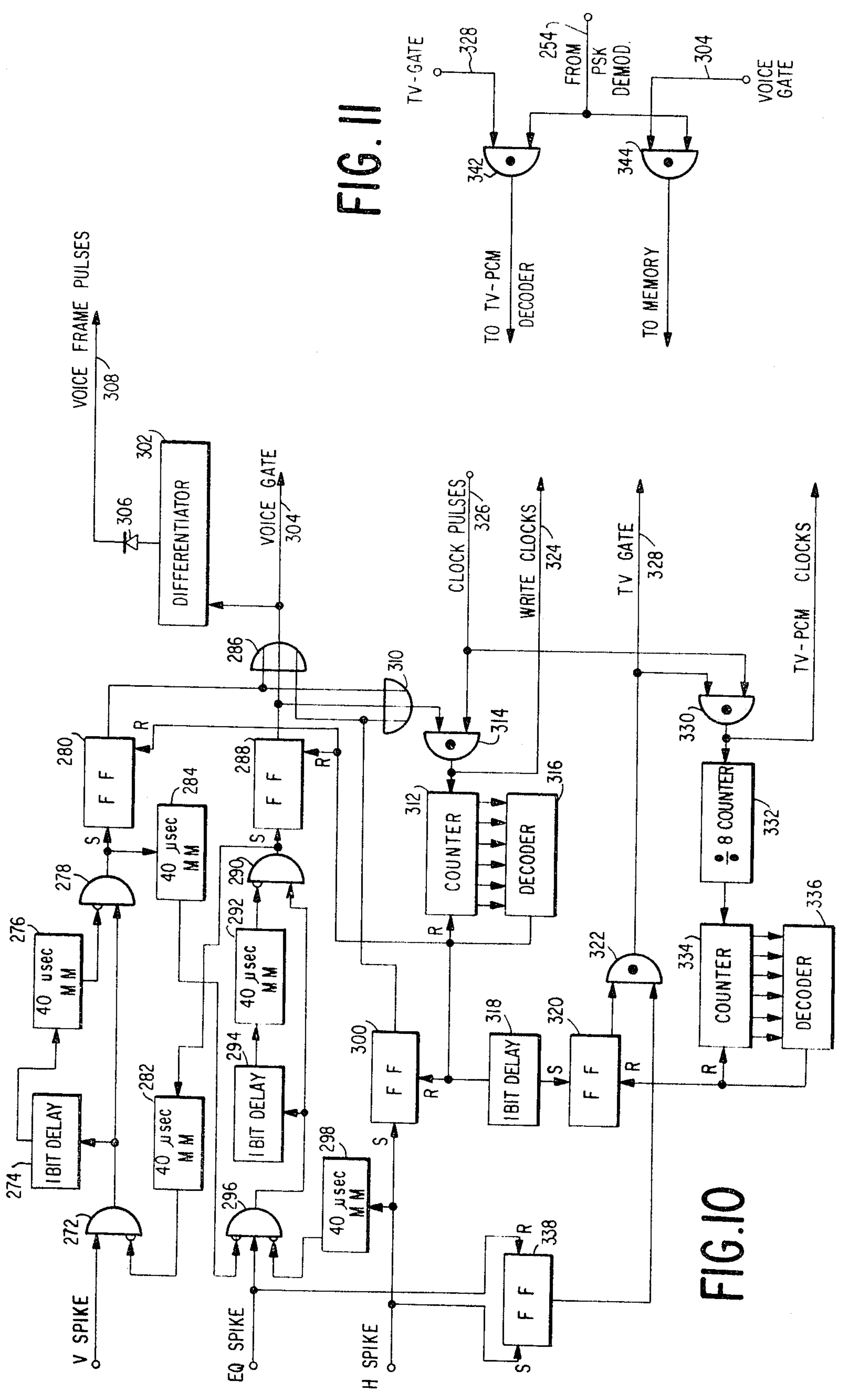
FIG. 10 is a block diagram of a timing circuit which is useful in the receiver of FIG. 8.
FIG. 11 is a block diagram of a distributor circuit which is useful in the receiver of FIG. 8.

One example of a timing circuit which may be used for the timing circuit 242 of FIG. 8 is illustrated in block diagram form in FIG. 10. In order to understand the function of the timing circuit, it must be remembered that in a received signal, 304 bits of sound data follow every horizontal unique word and every other vertical and equalizing unique word. Since the horizontal, equalizing and vertical spikes generated in the receiver are in coincidence with the last bit of the respective unique words, the input to the distributor 215 (FIG. 8) should be transferred to the memory 240 for a time equal to 304 clock pulse periods following every horizontal spike and every other equalizing and vertical spike.

Referring to FIG. 10, each horizontal spike sets a flip-flop 300 whose output is applied through an OR gate 286 to an output lead 304. The output on lead 304 is a pulse, referred to as a voice gating pulse, which has a duration equal to 304 clock pulse periods. The duration of the voice gating pulse is controlled by a counter 312 and decoder 316 combination. The output of flip-flop 300 also passes through OR gate 310 thereby energizing the upper input of AND gate 314. During the time that the upper input is energized, clock pulses on lead 326, from the PSK demodulator 214 (FIG. 8), pass through AND gate 314 and are accumulated by counter 312. The counter 312, decoder 316 combination operates in an identical manner to the counter 124, decoder 122 combination (FIG. 4) in the transmitter timing circuit. The output of the decoder resets the counter and also resets flip-flop 300 thereby terminating the voice gating pulse on lead 304. The clock pulses which are passed through AND gate 314 are also applied to output terminal 324 which is connected to the write counter (not shown) of the memory 240. Since the upper input of AND gate 314 will be energized only so long as flip-flop 300 is in the set condition, there will be 304 clock pulses on lead 324 which are sent to the write counter input for writing information into the memory 240 during the duration of the voice gating pulse on lead 304. Every voice gating pulse at lead 304 is passed through a differentiator 302 which produces positive leading edge spikes and negative trailing edge spikes. The positive leading edge spikes are passed through a diode 306 to lead 308 and represent voice frame pulses which are sent to the voice–PCM decoder 230 and the memory unit 240.

Every horizontal spike also triggers a 40 microsecond multivibrator 298 which inhibits INHIBIT gate 296 for a 40 microsecond period. The purpose of inhibiting gate 296 for a brief period of time following the horizontal spikes can be understood by referring to waveform a of FIG. 1A. It will be remembered that the transmission circuitry was operative to send out 304 bits of voice data following every spike which was separated from the prior spike by a distance equal to H. Thus, only every other equalizing and vertical spike causes the transmission of 304 bits of voice data. In waveform (*a*) of FIG. 1A it is seen that the 507th horizontal sync pulse, which is the last horizontal sync pulse of a previous frame, precedes the first equalizing pulse of the Field I sync group by a distance equal to H. Therefore, the first equalizing pulse in the Field I sync group will cause the transmission of voice data whereas the second equalizing pulse of the Field I sync group will not cause the transmission of voice data. Thus, for the Field I sync group, every other pulse starting with the first equalizing pulse will cause the transmission of sound data. However, in the Field II sync group which follows horizontal sync pulse 254, every other pulse will cause the transmission of voice data starting with the second equalizing pulse of the Field II sync group. That is because the first equalizing pulse of the Field II sync group follows the prior horizontal sync pulse by a distance equal to H/2, which is less than 40 microseconds.

Referring back to FIG. 10, it can now be understood that the 40 microsecond multivibrator 298 operates to block the equalizing spike generated in correspondence to the first equalizing pulse of every Field II sync group. The equalizing spikes which do pass through INHIBIT gate 296 are applied to another INHIBIT gate 290. The circuitry including the one bit delay 294, the 40 microsecond multivibrator 292, and the INHIBIT gate 290, operate to prevent every other equalizing spike out of gate 296 from passing through gate 290 and setting flip-flop 288. Any equalizing spike which is passed to the set input of flip-flop 288 also triggers a 40 microsecond multivibrator 282 thereby inhibiting INHIBIT gate 272 from passing the following vertical spike. The vertical spikes which do pass through INHIBIT gate 272 are applied to another INHIBIT gate 278 and to a circuit including a one bit delay 274 and a 40 microsecond multivibrator 276. The function of the delay 274, multivibrator 276 and INHIBIT gate 278 is to prevent every other output from gate 272 from passing through gate 278 to the set input of flip-flop 280. Any vertical spike which does pass to the set input of flip-flop 280 is also applied through a 40 microsecond multivibrator 284 thereby disabling gate 296 and preventing a following equalizing pulse from passing through gate 296.

When either of the flip-flops 280 or 288 is set, the outputs therefrom initiate the circuitry previously described in the same manner as the output from flip-flop 300, producing a voice gating pulse in lead 304, a voice frame pulse on lead 308, and write clock pulses on lead 324. The output from decoder 316, which resets counter 312 as well as flip-flops 280, 288 and 300, is applied through a one bit delay 318 to the set input of flip-flop 320. When flip-flop 320 is set, it energizes the upper input of AND gate 322. The lower input of gate 322 is energized by the output of flip-flop 338. It will be noted that flip-flop 338 corresponds in function to flip-flop 138 of the transmission timing circuit illustrated in FIG. 4. That is, it is set following the first horizontal spike and remains in the set condition until an equalizing spike is received. The output from AND gate 322 is a pulse having a duration equal to the duration of the received TV–PCM data and is referred to herein as the TV gating pulse. The duration of the TV gating pulse is determined by AND gate 330, divide by 8 counter 332, counter 334, and decoder 336. AND gate 330 passes clock pulses from lead 326 to the divide by 8 counter 332. The counters 332, 334, and decoder 336 combination operates in an identical manner to the counter 134, counter 132, and decoder 130 combination (FIG. 4) of the transmission timing circuit. The clock pulses passing through AND gate 330 are also passed to the TV–PCM decoder for decoding the received TV–PCM information.

An example of the distributor 216 of FIG. 8 is illustrated in FIG. 11 and comprises a pair of AND gates 342 and 344. The digital information from the PSK demodulator is applied to one input of each AND gate 342 and 344. The voice gate on lead 304 of the timing circuit (FIG. 10) is applied to the other input of AND gate 344, the output therefrom being applied to the memory unit 240. The TV-gate on lead 328 of the timing circuit is applied to the other input of AND gate 342, the output therefrom being applied to the TV–PCM decoder 218.

As mentioned above, the memory unit 240 (FIG. 8) is identical to the memory unit (FIG. 7) of the transmission circuit (FIG. 2), with the exception that data is written into the memory unit 240 at the 64 megabit per second clock rate and read out at a 4.788 megabit per second clock rate. An example of the voice–PCM decoder 230, which receives encoded voice data from memory unit 240, decodes it and sends it out on 38 separate output channels, is illustrated in FIG. 12. The voice decoding circuitry operates in a reverse manner to the voice encoding circuitry illustrated in FIG. 6. A clock pulse generator 350 provides clock pulses at the rate of 4.788 megabits per second. The clock pulses are transferred via lead 366 to the read counter of memory 240. The clock pulses are also sent to a divide by 8 counter 352 whose output pulses are sent to a channel counter 354 and to the PCM decoding circuit 362. All of the units indicated by blocks are conventional and additional detailed description is therefore not necessary.

The channel counter 354, which is reset by voice frame pulses from the timing circuit (FIG. 10) applied to the reset input of the channel counter 354 via lead 364 will count up to 38 following each voice frame pulse. The condition of the channel counter 354 is sensed by decoder 356 which sequentially samples sampling gates 358. The decoded sound signals out of the PCM decoding circuit 362 are passed through the gates 358 and through low pass filters 360 to the 38 separate voice channels. The low pass filters smooth the series of pulses through any one sampling gate 360 into a continuous signal.

A second embodiment of the invention provides band compression of the TV–PCM information transmitted. Band compression is simply the reduction of the total bandwidth necessary to transmit a given channel or group of information. Techniques for reducing the bandwidth in transmission systems have been the subject of much study. The opposing requirements which must be considered in such techniques are the necessity to remove certain information in order to decrease bandwidth and the need to maintain received signal degradation at an acceptable level. The band compression technique which is a part of the present invention is based upon the similarity of horizontal lines from frame to frame of a TV waveform. In a TV waveform, many lines of picture information will be so close in content to the corresponding lines in a previous frame that they need not be transmitted. Thus, the technique of the present invention includes the transmission of only those lines within each frame which have undergone significant change. Since the number of lines transmitted per frame is reduced and the frame time stays the same, by stretching the transmission of the transmitted lines over the frame time, the bandwidth of the transmitted signal is reduced.

In the present invention, it is assumed that the bandwidth compression ratio is 2:1, i.e., a maximum of half of the horizontal lines may be transmitted during a single frame period. The bandwidth compression ratio chosen depends upon the degradation of a picture content which is acceptable at the receiving end of the system. It should be understood that the 2:1 factor is not intended to be limiting to the invention but is only used herein as an example to describe a specific embodiment of the invention.

The same constants described above in connection with the first embodiment will be used to describe the bandwidth reduction embodiment, except that no sound information will be transmitted; also, in addition to the 60 bit unique word which identifies each horizontal sync pulse, an additional 10 bits are used to identify the number or address of the particular horizontal line within a frame. Thus, in response to each horizontal sync pulse there will be generated a 70 bit word with the first 60 bits being the same for every line and the last 10 bits identifying the address of the particular line.

A block diagram of the overall transmission system of the bandwidth compression embodiment is illustrated in FIG. 13. The signal applied at input terminal 400 is the television waveform (*a*) of FIG. 1A. The waveform is connected to a sync and equalizing pulse extractor 402 which may be identical to the sync and equalizing pulse extractor 12 of FIG. 2. The output therefrom is applied to a horizontal sync and equalizing pulse timing generator 404 which is operative to provide one output spike on lead 406 corresponding to the first equalizing pulse within every frame, and a series of horizontal spikes on output lead 408 corresponding to the horizontal sync pulses within the frame. A particular circuit which may be used for the horizontal sync and equalizing pulse timing generator 404 will be described below.

The horizontal and equalizing spikes from the timing generator 404 are applied as inputs to a timing circuit 410 which operates in a manner similar to the timing circuit of the first embodiment to distribute the clock pulses to different parts of the remaining transmitter circuitry to control the times at which certain events occur. The timing circuit 410 provides TV clock pulses and TV sample pulses to the TV–PCM circuit 418 which receives the television waveform via a delay circuit 416. The delay 416 serves the same purpose as the delay 20 of the first preferred embodiment, that is, it positions the start of each line of picture information just after the termination of the horizontal unique word. TV–PCM circuits which receive analog information and convert it into digital information at its output are well known in the art and therefore the circuit 418 will not be described in any further detail herein.

The timing circuit also provides a group of 60 clock pulses to the equalizing unique word generator 414 following each equalizing spike. Also, after each horizontal spike a group of 70 clock pulses are sent by the timing circuit 410 to the horizontal unique word generator 412. The equalizing and horizontal spikes from timing generator 404 are also applied to the horizontal unique word generator 412 for reasons which will be apparent hereafter.

The output of the TV–PCM circuit 418, which is the picture information in digital code form, is applied to a redundancy removal circuit 420 which is operative to transmit only those lines of information which have changed a preset amount over the one frame period. The outputs from the redundancy removal circuit 420, the horizontal unique word generator 412, and the equalizing unique word generator 414 are applied to a bit rate reduction circuit 422. All digital information into the bit rate reduction circuit is received at the 64 megabit per second clock rate and transmitted at a 32 megabit per second clock rate, resulting in a bandwidth compression ratio of 2:1. The output of the bit rate reduction circuit 422 is applied to a PSK modulator 424 and an RF transmitter 426. The PSK modulator and RF transmitter are circuits well known in the art as mentioned above in the description of FIG. 2.

Figure 14:
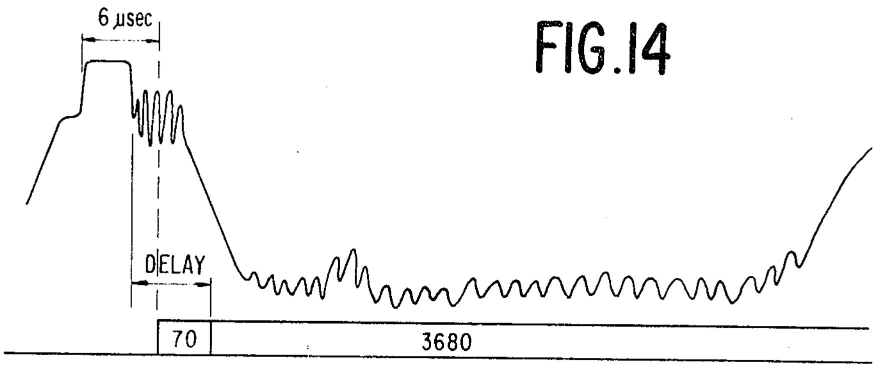
FIG. 14 is a waveform diagram helpful in explaining the operation of FIG. 13.

As in the case of the first embodiment, the time delay necessary for delay 416 may be easily calculated for any given set of constants used in the system. An example of the amount of delay necessary for the given horizontal line time and unique word bit length is shown in FIG. 14. Note that the horizontal spike produced by the timing generator 404 is generated 6 microseconds following the leading edge of each horizontal sync pulse. The beginning of the picture information should follow directly behind the 70 bit unique word.

Figure 15:
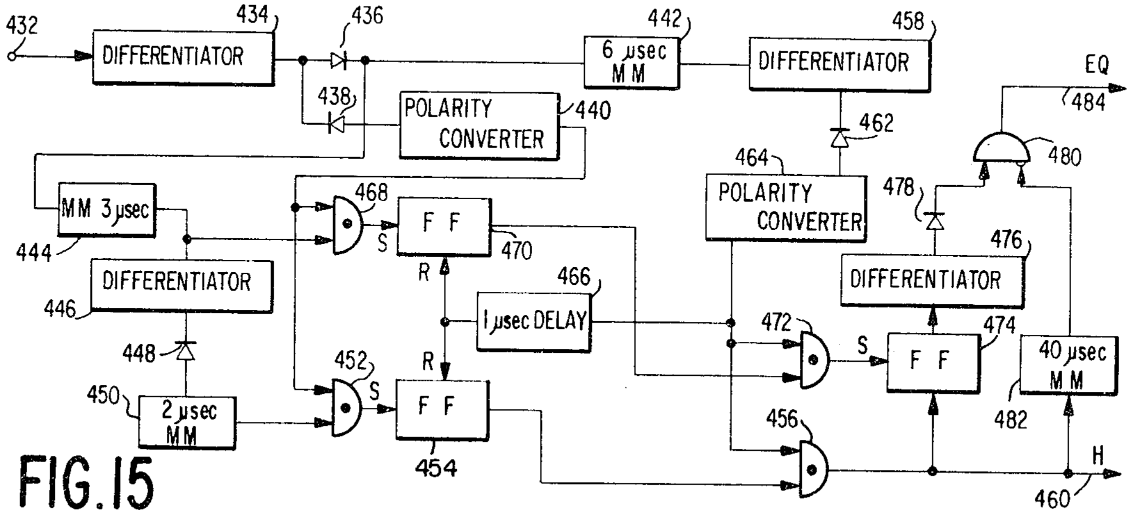
FIG. 15 is a block diagram of a pulse timing generator which may be used in the transmitter of FIG. 13.

One example of a timing generator which is capable of providing an output spike corresponding to the first equalizing pulse within each frame and a series of output spikes corresponding to the horizontal sync pulses within the frame is illustrated in FIG. 15 and may be used for the timing generator 404 of FIG. 13. In FIG. 15 the horizontal and vertical sync pulses and the equalizing pulses out of the pulse extractor 402 (FIG. 13) are applied via lead 432 to a differentiator 434 whose output is connected to a pair of opposite polarity diodes 436 and 438. The spikes corresponding to the lagging edge of every input pulse are applied through diode 438 and polarity converter 440 to the upper inputs of AND gates 468 and 452. The latter mentioned spikes will be passed through AND gate 468 if the received pulse is an equalizing pulse and through AND gate 452 if the received pulse is a horizontal sync pulse. If the received pulse is a vertical sync pulse, the spike will not pass through either of the AND gates.

The AND gates are controlled by the leading edge spikes out of differentiator 434. The leading edge spikes are applied through diode 436 to a 3 microsecond multivibrator 444 which gates AND gate 468 on long enough to catch the trailing edge spike of an equalizing pulse. The 3 microsecond gating pulse is differentiated by differentiator 446 and the negative spike output therefrom is applied to a 2 microsecond multivibrator 450 which provides a 2 microsecond gating pulse to turn on AND gate 452 for a time sufficient to pass trailing edge spikes generated in response to a received horizontal sync pulse.

Spikes which pass through AND gates 468 and 452 set flip-flops 470 and 454 respectively. Flip-flop 470 energizes the lower input of AND gate 472, and flip-flop 454 energizes the lower input of AND gate 456. Six microseconds following the leading edge of an input pulse on lead 432, a decision is made as to whether the input pulse is an equalizing pulse, a horizontal sync pulse, or a vertical sync pulse. Note, that no output spikes are provided from the overall apparatus of FIG. 15 for vertical sync pulses. The decision circuitry includes a 6 microsecond multivibrator 442, a differentiator 458, a diode 462 which passes lagging edge spikes out of the differentiator 458, and a polarity converter 464. The latter circuitry combines to provide an output spike from polarity converter 464 which is delayed 6 microseconds with respect to a leading edge of every pulse applied to differentiator 434. The output spike from converter 464 will be blocked in the case of vertical sync pulse, will pass through AND gate 472 in the case of an equalizing pulse, and will pass through AND gate 456 in the case of a horizontal sync pulse.

All horizontal spikes out of AND gate 456 will be applied to an output terminal 460 thereby forming a train of horizontal spikes. However, only the first equalizing pulse in every frame will generate an equalizing spike on the output lead line 484. The circuitry for preventing the other equalizing spikes from reaching the output lead line 484 includes flip-flop 474, 40 microsecond multivibrator 482, differentiator 476, diode 478, and inhibit gate 480. Every spike out of AND gate 472 sets flip-flop 474, which is reset by horizontal spikes out of AND gate 456. Thus, flip-flop 474 will be set by the first equalizing pulse within the field I sync group and will remain set until the occurrence of the first horizontal spike following the field I sync group. The output from flip-flop 474, which is a square wave having a leading edge in time coincidence with the setting spike and a lagging edge in time coincidence with the resetting spike, produces a pair of output spikes, only the first of which passes through diode 478 to inhibit gate 480. As long as there is no input to the inhibiting terminal of inhibit gate 480, the spike which passes through diode 478, and which corresponds to the first equalizing pulse of a field I sync group will pass through gate 480 to the equalizing spike output terminal 484.

Every horizontal spike on the output terminal 460 triggers a 40 microsecond multivibrator 482 which inhibits inhibit gate 480 for a 40 microsecond period following every horizontal spike. Since the first equalizing pulse within every frame follows the last horizontal sync pulse of the preceding frame by more than 40 microseconds, the 40 microsecond inhibiting pulse will not prevent a spike corresponding to the first equalizing pulse of every frame from passing through gate 480. However, the first equalizing pulse within the field II sync group follows the preceding horizontal sync pulse by less than 40 microseconds and therefore the spike passing through diode 478 corresponding to the first equalizing pulse of the field II sync group will be inhibited by the 40 microsecond inhibiting pulse out of multivibrator 482.

Figure 16:
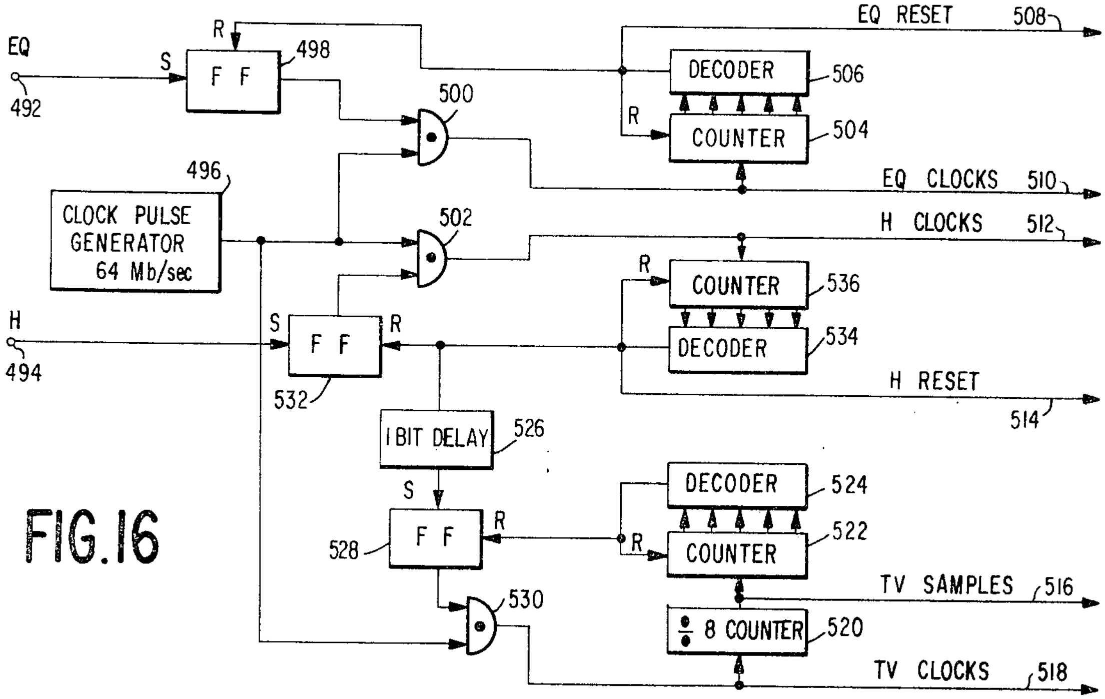
FIG. 16 is a block diagram of a timing circuit which controls the timing of events in the transmitter of FIG. 13.

The horizontal spikes and the single equalizing spike, which represents the beginning of each frame, are applied to the timing circuit 410 (FIG. 13), a specific example of which is illustrated in FIG. 16. The equalizing spikes are received at terminal 492 and set flip-flop 498 which energizes AND gate 500 to pass clock pulses from clock pulse generator 496 to output lead 510. The clock pulses appearing on output lead 510 are referred to as the equalizing clock pulses, and occur in groups of 60 which are sent to the equalizing unique word generator. The number of clock pulses sent out on lead 510 is controlled by a counter 504-decoder 506 combination which is identical to the counter 106-decoder 108 combination of FIG. 4. The counter-decoder combination accumulates the clock pulses on lead 510 and resets flip-flop 498 following the 60th clock pulse into counter 504. The reset output of decoder 506 is also sent out on lead 508 to the equalizing unique word generator 414 (FIG. 13) to serve as the equalizing reset pulse.

The horizontal spikes, which are received at terminal 494, set flip-flop 532 which energizes AND gate 502 to pass clock pulses from clock pulse generator 496 to output lead 512. The clock pulses on output lead 512 are referred to as the H clock pulses and are used to clock the horizontal unique word generator 412 (FIG. 13). The number of H clock pulses in each group, seventy in all, is controlled by the counter 536-decoder 534 combination which is similar to the counter 504-decoder 506 combination with the exception that decoder 534 responds to a count of 70 instead of to a count of 60. The output of decoder 534 resets flip-flop 532 and is also applied via output lead 514 to the horizontal unique word generator for the purpose of serving as the horizontal reset pulse.

The output of decoder 534 is also delayed one bit in time by one bit delay 526 and applied to the set input of flip-flop 528 which energizes AND gate 530 to pass clock pulses from clock pulse generator 496 to output lead 518. The clock pulses on output lead 518 will be in groups of 3,680 clock pulses and are referred to as the TV clocks. The TV clocks are also applied to a divide by 8 counter 520 which provides TV sampling pulses on lead 516 which are applied along with the TV clocks to the TV–PCM circuitry. The output of divide by 8 counter 520 is applied to a counter 522-decoder 524 combination which is identical to the counter 132-decoder 130 combina2tion of FIG. 4. The reset output of decoder 524 resets counter 522 as well as flip-flop 528. Thus, the timing circuit responds to the equalizing and horizontal spikes to distribute the clock pulses from clock pulse generator 496 in groups to the TV–PCM circuitry, the horizontal unique word generator and the equalizing unique word generator.

The equalizing unique word generator 414 of FIG. 13 receives the equalizing clocks and the equalizing reset pulse from timing circuit 410 and may be identical to the unique word generator illustrated in FIG. 5. Its purpose is to provide a 60 bit word which uniquely identifies the equalizing spike.

The horizontal unique word generator 412 is different than the equalizing unique word generator because it must be capable of generating a 70 bit word, the last 10 bits of which vary with each different horizontal spike during a single frame. One example of a coding system which can be used for the horizontal unique word generator is illustrated in FIG. 17. The horizontal clocks from timing circuit 410 are accumulated by a binary counter 542 which is capable of counting at least up to 70. The output terminals from every stage of the binary counter 542 are applied in parallel to a decoder 544 which may be a matrix decoder of the type described in connection with FIG. 5. One difference is that the decoder 544 has 70 outputs corresponding to accumulations of binary counter 542 representing counts of 1 through 70. Note that the first 60 outputs of decoder 544 are connected through a plurality of manual switches 562 to the OR circuit 560. Thus, the first 60 bits of every horizontal unique word will be the same and will be determined by the open closure setting of manual switches 562. The last 10 output leads from decoder 544 are applied to respective AND gates 540. The other inputs to AND gates 540 are energized by the output leads 548 of horizontal spike counter 550. The counter 550, as will be explained in more detail hereinafter, contains a number corresponding to the number of horizontal spikes applied at its input delayed one horizontal line. The counter is reset to zero by each equalizing spike.

Each horizontal spike is applied to a multivibrator 558 which provides an output pulse having a duration equal to the horizontal line period, approximately 63 microseconds. The multivibrator output pulse is differentiated by differentiator 556 and the spike corresponding to the lagging edge thereof is passed through diode 554 and polarity inverter 552 to the input of counter 550. Thus, if counter 550 operates on the simple binary system, when the first group of clock pulses is received by binary counter 542, the horizontal spike counter 550 will contain a binary zero count and the last 10 bits of the horizontal unique word will be all zeroes. When the second group of horizontal clock pulses is received, the last 10 bits of the generated horizontal unique word will register a binary 1. The generated horizontal unique word appears at the output of OR circuit 560, and contains, in series, 60 bits which are common to every horizontal word output and 10 address bits.

Figure 18:
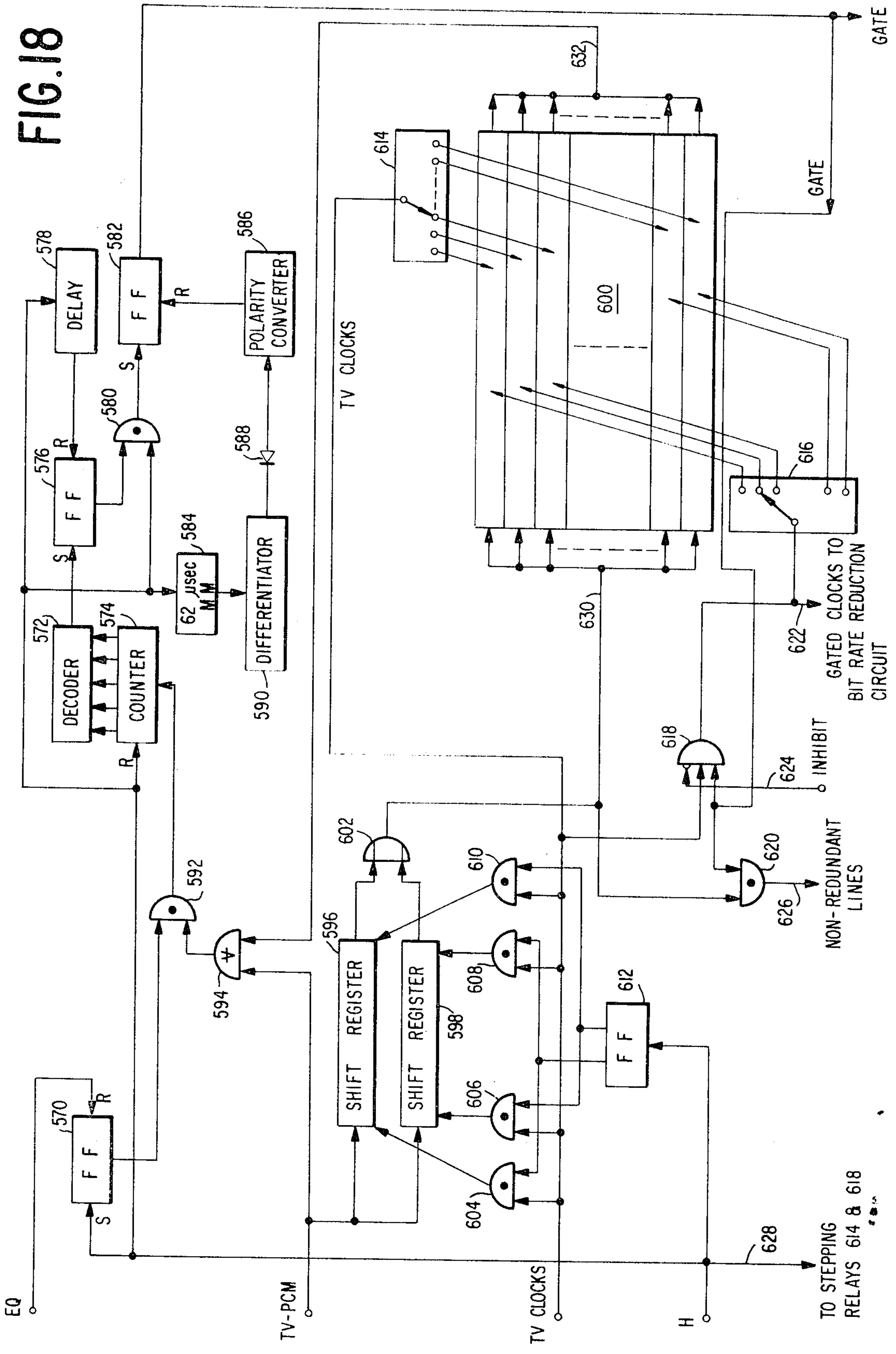
FIG. 18 is a block diagram of a redundancy removal circuit which forms a part of the transmitter of FIG. 13.

Referring again to the block diagram of FIG. 13, it was previously stated that the purpose of the redundancy removal circuit 420 is to receive every line of TV–PCM data but only send out those lines of TV–PCM data which are different by a predetermined amount from the corresponding lines of the prior frame. One specific example of a system which provides redundancy removal is illustrated in FIG. 18. The system as shown in FIG. 18 includes a memory means such as a shift register type memory 600 which includes a plurality of rows of storage elements. The number of rows is equal to the number of horizontal sync pulses per frame, and the number of bits capable of being stored in any single row is equal to the number of TV–PCM bits per horizontal line. In the specific example described herein, each row has a storage capacity of 3,680 bits. Information is read into the memory via lead 630 and read out of the memory via lead 632. The particular row into which the incoming information is written is determined by the read-in stepping relay 616.

The stepping relay 616 may be any conventional type of stepping relay which has a number of output terminals equal to the number of rows in the memory. The input terminal of stepping relay 616 receives clock pulses via inhibit gate 618. The particular output terminal of stepping relay 616 to which the clock pulses are connected gates the incoming information on lead 630 into a corresponding row of the memory 600. For example, in the position illustrated in the drawing, if clock pulses are received by stepping relay 616, they will gate incoming data on lead 630 into the second row. The switch within stepping relay 616 is stepped by horizontal sync pulses in a manner well known in the art. Thus, each horizontal sync pulses moves the switch to the succeeding output terminal.

Memory read-out is accomplished by a conventional relay stepping switch 614 in the same manner as described for the read-in. The switch in relay 614 is connected to one of the output terminals, each one of which clocks the information out of the corresponding row within memory 600. The stepping relay switches are set so that the switch in read-out relay 614 is always one row ahead of the switch in read-in relay 616. As an example, when read-out clocks are applied to read-out the information from row three, the read-in clocks are applied via relay 616 to read in information into row two. The memory, in the specific example described herein, is a non-destructive read-out memory. This can be easily accomplished in a shift register type memory by recycling the output back to the input during read out time. Thus, information in any row is destroyed only by reading in new information and not reading-out the contents of any row.

In general, the redundancy system of FIG. 18 operates to receive each line of TV–PCM data from the TV–PCM circuitry, compare the incoming data with the stored information corresponding to the same line from a previous frame on a bit by bit basis, make a decision as to whether the stored line is sufficiently different from the incoming line, and transmit the non-redundant lines to the bit reduction circuitry.

The TV–PCM data out of the TV–PCM circuitry is applied to a pair of alternating shift register-type memories 596 and 598. Each of the shift register-type memories 596 and 598 has a storage capacity of 3,680 bits, corresponding to a single horizontal line. Read-in and read-out from the shift register-type memories is controlled by AND gates 604, 606, 608 and 610 which supply clock pulses to shift the contents of the shift register memories in accordance with controls determined by flip-flop 612. The flip-flop 612 causes TV clocks from the timing circuit to shift received information into one of the shift registers and shift the stored information out of the other shift register. The flip-flop 612 in response to each horizontal spike alternates the functions of the memories. Thus, during each group of 3,680 TV clocks, one shift register-type memory has information written therein and the other shift register-type memory has information read-out therefrom. The information read out of the shift register-type memory passes through an OR gate 602 to the input lead 630 of memory 600. The latter information will not pass into any of the memory rows unless clock pulses are applied to the read-in stepping relay 616.

The TV–PCM data is also applied as one input to an exclusive OR gate 594 which operates in a well-known manner to provide an output pulse in response to each non-coincidence of the inputs on the two input leads. The other input to the exclusive OR circuit 594 is from a row in the memory 600 which corresponds to the horizontal line presently being received by the redundancy removal circuit. Note that the TV clocks are applied to the read-out relay stepping switch 614 to gate out the contents of the selected row within memory 600. The number of output pulses from gate 594 during each horizontal line period is a representation of the difference in picture content of that particular line from frame to frame.

The pulses out of the exclusive OR circuit 594 pass through AND gate 592 and are accumulated by a counter 574 which cooperates with a decoder 572 to provide an output when the counter reaches a certain predetermined level. The counter-decoder combination is the same as the counter-decoder combinations previously described. The particular setting of the decoder depends upon the amount of degradation which is considered acceptable to a viewer at the receiver. The counter is reset to zero by every horizontal sync pulse and therefore the decoder 572 will provide an output pulse only when the incoming line of TV data is substantially different from the stored line of TV data, thereby indicating that the incoming line of TV data is non-redundant and should be transmitted.

The output pulse from decoder 572, indicating that the received line is non-redundant, sets flip-flop 576 at some time between received horizontal sync pulses. The next following horizontal spike passes through AND gate 580, which is energized by flip-flop 576, to set flip-flop 582. The horizontal spike is also passed through a delay circuit 578 having a very small delay time to reset flip-flop 576. The delay 578 serves only the purpose of allowing the horizontal spike to pass through AND gate 580 prior to resetting flip-flop 576. Thus, the flip-flop 582 provides an output gate whose leading edge is in coincidence with the horizontal spike directly following a non-redundant line.

The duration of the gate output of flip-flop 582 should be long enough to encompass the 70 bit word plus the 3,680 bits of TV–PCM data. Also, the gate output of flip-flop 582 must not have a duration greater than the horizontal line time which is approximately 63 microseconds. Therefore, the gating time is controlled by a 62 microsecond multivibrator 584, a differentiator 590, a diode 588, and a polarity converter 586. The 62 microsecond multivibrator is selected only because it will result in a gate output of duration long enough to encompass the 70 bit word plus the TV–PCM data but not as long as a horizontal line time. It will be apparent to those having ordinary skill in the art that the 62 microsecond time of multivibrator 584 is not critical.

The output gate pulse, which occurs only when the prior received line is non-redundant, controls the entry of the prior received line into the proper row of memory 600 and also controls the transmission of the prior line to the bit rate reduction circuitry (FIG. 13). It will be noted that although the gate occurs one horizontal period following the non-redundant line, it controls the entry of the proper information since read-out from shift registers 596 and 598 occurs one horizontal line time following read-in of the information into those shift register-type memories. Thus, the gate from 582 energizes AND gate 618 which passes the TV clocks therethrough to the read-in relay stepping switch 616 to clock the information read-out from either shift register 596 or 598 into the proper row of memory 600.

It should be noted that since the switch of read-out relay stepping switch 614 leads the switch of read-in relay stepping switch 616 by one position, the row from which the contents was previously compared with the non-redundant line is the same row into which the non-redundant line is entered in response to the gate from flip-flop 582. This is because the gate occurs after the horizontal sync pulse which advances the position of the switches in the relay stepping switches.

The gate also energizes AND gate 620 through which the non-redundant line passes to the bit rate reduction circuitry. Thus, on lead 622 there will be a plurality of clock pulses only during the time that non-redundant TV–PCM data appears on lead 626. Although in the above description, gate 618 was described as an AND gate, it will be noted that the gate 618 has an inhibit input terminal to which is applied an inhibit pulse. The inhibit pulse is received from the bit rate reduction circuitry 422 (FIG. 13) and its purpose will be understood following a detailed explanation of the bit rate reduction circuitry, given below. Although the redundancy removal circuit of FIG. 18 operates to compare lines on a bit-by-bit basis, it will be apparent to anyone having ordinary skill in the art that comparison can be made on a word-by-word basis (each TV–PCM word being 8 bits long in this specific example) by entering the received line and the stored line into a pair of eight bit shift registers and comparing only the most significant bits of the received and stored words, each non-coincident comparison resulting in an input being applied to the counter.

Figure 19:
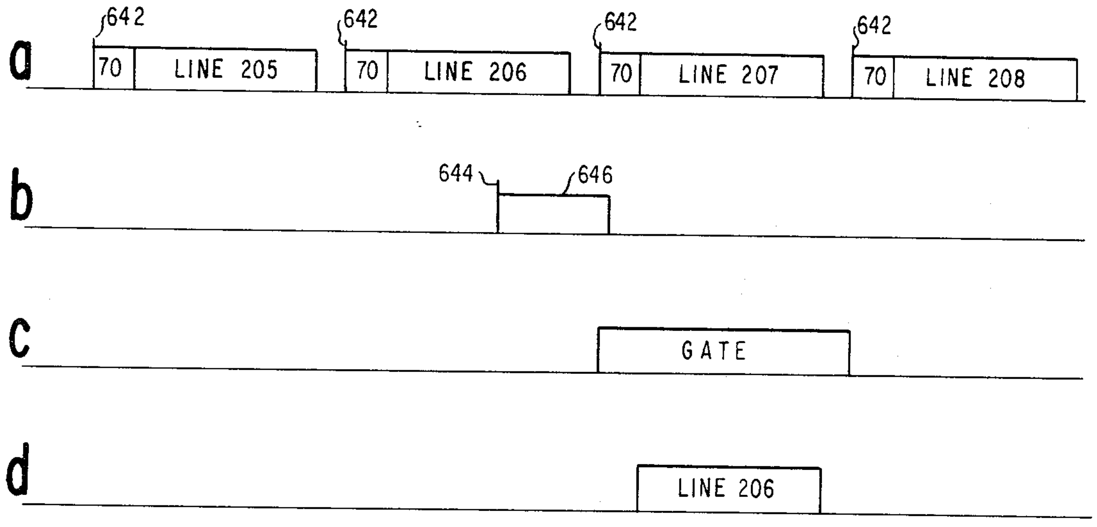
FIG. 19 is a timing diagram which illustrates the relative time of occurrence of certain events in the transmitter of FIG. 13.

The time sequence of events in the redundancy removal circuitry of FIG. 18 is illustrated by waveforms (*a*) through (*d*) of FIG. 19. Waveform (*a*) represents the time sequence of the received information. For each horizontal line there is a horizontal spike, 642, a 70 bit period following each horizontal spike which is occupied by the horizontal unique words (not applied to the redundancy removal circuit), followed by the line picture information. In waveform (*a*), each line is given a number of the purpose of indicating the timing sequence. It will be noted that the 70 bit word plus the 3,680 bits of TV–PCM information per line do not occupy the entire horizontal line. It is assumed that only line 206 is non-redundant and therefore the received contents of line 206 is the only line which will be transmitted to the bit rate reduction circuit over lead 626 of the redundancy removal circuit. When the decoder 572 detects that counter 574 has received a predetermined number of inputs representing differences between received line 206 and stored line 206, the decoder provides an output pulse to the flip-flop 576. The output pulse from decoder 572 is indicated by pulse 644 of waveform (*b*) of FIG. 19 and the output of flip-flop 576 is indicated by the gating pulse 646 of waveform B. Note that the gating pulse extends slightly past the next horizontal spike. This is due to the delay circuit 578. The next horizontal spike then initiates a gate from flip-flop 582, which is 62 microseconds long and which is illustrated by waveform (*c*). The time at which the information is transmitted to the bit rate reduction circuit is indicated by waveform (*d*).

One example of a system which may be used as the bit rate reduction circuit 422 (FIG. 13) of the transmitter is illustrated in block diagram form in FIG. 20. It will be remembered that in the specific example described herein, the bandwidth compression ratio is 2:1. Therefore, the bit rate reduction circuit must receive the non-redundant TV–PCM data and corresponding horizontal unique words at the input bit rate of 64 megabits per second, and transmit the received data at an output bit rate of 32 megabits per second. Since the bandwidth compression ratio is 2:1, it is assumed that no more than half of the picture lines will be non-redundant during any single frame, and it will be apparent to anyone having ordinary skill in the art that a 32 megabit per second output bit rate is sufficient to transmit all of the non-redundant lines occuring during the one frame period provided that number does not exceed half of the total number of lines in the frame. The bit rate reduction circuit, however, is also capable of providing the correct output data at the 32 megabit per second output rate even in those cases when the number of non-redundant lines occuring in a single frame period exceeds half of the total number of lines. The latter operation will be referred to herein as the irregular operation case and will be more readily understood following the detailed description of FIG. 20.

The apparatus shown in FIG. 20 includes a pair of shift register-type memory circuits 652 and 668. Each memory has a storage capacity which is sufficient to store 70 unique word bits and 3,680 picture data bits for half of the active picture lines in a single frame. As pointed out above, the number of active horizontal sync pulses, and therefore the number of active picture lines, in a single frame is 490. Therefore, each shift register-type memory has a bit capacity of $$(70+3,680)\times 245=918,750.$$

The two shift register-type memories 652 and 668 are alternated in their read-write functions by flip-flop 664, and AND gates 656, 658, 660 and 662. The functions are alternated periodically in response to an equalizing spike which toggles flip-flop 664. The output of the flip-flop 664 energizes two of the four AND gates to pass clock pulses to the shift input terminals of the memories in order to write information into one memory and read information out of the other memory. The data entered into the memory will be the horizontal unique word which identifies one of the non-redundant lines and the non-redundant line itself. The latter two types of information are passed through OR gate 650 and through one of the AND gates 654 or 680 to the input of memory 652 and 668 respectively.

The horizontal unique word is gated into one of the memories by horizontal clocks which pass through inhibit gate 672, OR gate 670, and one of the controlling AND gates 656 or 660. It will be noted that in order for the horizontal clocks to pass through gate 672 there must be a gate input on the upper input terminal of gate 672 and the absence of an inhibit input at the inhibit terminal of gate 672. The gate pulse applied to the upper input of AND-INHIBIT gate 672 is the gate output from the redundancy removal circuit shown in detail in FIG. 18. It will be remembered that the latter gate pulse occurs during the horizontal line time following a horizontal line spike in which a non-redundant line is transmitted to the bit rate reduction circuit by the redundancy removal circuit. Since the gate pulse begins in coincidence with a horizontal spike, it encompasses the 70 bit unique word which identifies the non-redundant line. Thus, when there is a nonredundant line about to be received at the OR gate 650 of the bit rate reduction circuit, and only when there is a non-redundant line about to be received, the gating pulse will allow the horizontal clocks from the timing circuit 410 (FIG. 13) to clock the received horizontal unique word into the memory which is presently adapted to receive information. Following the entry of a horizontal unique word which identifies a non-redundant line, the non-redundant line itself will be clocked into the memory by the gated clocks which are received from the redundancy removal circuit. The gated clocks are passed through OR gate 670 and through one of the AND gates 656 or 660.

Read-out from the memories 652 and 668 is controlled by clock pulses from the 32 megabit per second clock pulse generator 686. The latter clock pulses pass through inhibit gate 684 and then through one of the AND gates 658 or 662 to clock the information stored in memory 652 or 668, respectively, out of the memory and through OR gate 66 to the PSK modulator 424 (shown in FIG. 13). The horizontal unique words and the corresponding non-redundant lines are preceded in each frame period by the equalizing unique word. The equalizing unique word is received by the bit rate reduction circuit also at the rate of 64 megabits per second and must be transmitted at the lower rate of 32 megabits per second. One simple circuit for performing the bit rate conversion of the unique word comprises a 60 bit storage memory 694 and a pair of electronic relay stepping switches 692 and 688. The equalizing unique word is applied to the input of electronic relay stepping switch 692 at a 64 megabit per second rate and appears at the output of the electronic relay stepping switch 688 at the 32 megabit per second output rate. The stepping switch 692 is stepped by the equalizing clocks which occur at the fast rate and the stepping switch 688 is stepped by the clocks from clock pulse generator 686 which are passed through AND gate 690. AND gate 690 is energized to pass clock pulses by the output of a flip-flop 682 which is set by equalizing spikes and reset by an output from stepping relay 688 which is in coincidence with the 60th bit out of stepping relay 688. It should be noted that the reset input to flip-flop 682 could be controlled by a counter-decoder combination which accumulates the stepping pulses out of AND gate 690 and provides an output reset pulse when 60 stepping pulses have been accumulated. Also, it is possible to include an additional relay and battery means within the electronic stepping relay such that a pulse will appear on lead 696 to reset flip-flop 682 when the movable switch comes into contact with the output switch from the 60th bit position of memory 694. Under either condition, the flip-flop output pulse lasts for a duration equal to 60 clock pulse periods (at the 32 megabit per second clock pulse rate) and gates clock pulses through AND gate 690 to step the relay 688, and also inhibits clock pulses from passing through gate 684 during that time.

Thus, from the above description of FIG. 20, it can be seen that during normal operation (no more than half the active lines are non-redundant during the one frame period) one memory receives non-redundant lines along with corresponding horizontal unique words while the other memory sends its contents to the PSK modulator, and when the next equalizing spike is received, the memory functions are reversed. The timing of a normal operation of the bit rate reduction circuitry is illustrated by the diagram shown in FIG. **21*a*, wherein the first line represents the equalizing spikes which occur at the beginning of each frame, and the second and third lines represent the times at which memory 652 and 668** respectively read and write information.

In order to provide proper operation during the conditions where the picture content changes so much from one frame to the next that more than half of the lines are non-redundant, the system includes a counter 676-decoder 678 arrangement and a multivibrator 674 which provides an output pulse having a duration equal to the TV frame time. The counter 676-decoder 678 combination is the same as the counter-decoder combinations previously described except that the counter must be capable of counting up to 918,750 (the number of bit storage locations in each of the memories) and the decoder 678 must respond to a count of 918,750. The counter is reset at the beginning of each frame by an equalizing spike and keeps track of the number of bits of information entered into the writing memory during the frame. If half or less than half of the lines are non-redundant, the counter will be reset before the decoder has an opportunity to trigger the multivibrator 674, and the normal operation described above will not be interrupted. However, if more than half of the lines during a one frame period are non-redundant, the writing memory will be completely filled and the counter-decoder combination will provide an output pulse which triggers multivibrator 674. The multivibrator 674 provides an output pulse which is applied to gate 672 to inhibit horizontal clocks from passing through gate 672, and is applied to the redundancy removal circuit (FIG. 18) to inhibit gated clocks from passing through AND-INHIBIT gate 618. The gated clocks and the horizontal clocks are thus blocked for an entire frame, no information can be written into either memory 652 or 668 during this time. However, since the controlling flip-flop 664 is unaffected by the output of decoder 678, the read-out functions of memories 652 and 668 are unimpaired. The result is an irregular operation in which it takes two frame periods to transmit to the PSK modulator the non-redundant line information which would ordinarily be transmitted to the PSK modulator in a single frame period.

The irregular operation case is illustrated diagrammatically by FIG. **21*b* which shows the timing relationship between the equalizing spikes, the output from decoder 678, the inhibit gate pulse generated by multivibrator 674 and the read and write times of memories 652 and 668**. It should be noted that if the picture content changes from one frame to the next so significantly that the irregular operation case will result, it will be very improbable that the following frame will also result in a significant change in picture content. It should also be noted that since each line transmitted by the transmission circuitry is preceded and identified by a special 70 bit horizontal unique word, the fact that the transmitted lines are not in proper numerical sequence is unimportant.

One specific embodiment of a receiving system of the present invention which is capable of receiving the data which is transmitted by the transmitter of FIG. 13, is illustrated in general block diagram form in FIG. 22. The receiver comprises at its front end a radio frequency receiver 700 and a PSK demodulator 702. The latter two functional units are well known in the art and will not be described in any detail herein. They may be the same type of units used for the receiver illustrated in FIG. 8. The PSK demodulator provides output clocks, referred to as BIT TIMING, on lead 712 at the received information bit rate, which is 32 megabits per second. Also, the demodulated pulse code information out of the PSK demodulator 702 is applied to a memory unit and bit rate converter 704, a horizontal unique word detector 708, and an equalizing unique word detector 710. The 32 megabit per second clock pulses are also applied to the memory unit and bit rate converter 704, the horizontal unique word detector 708 and the equalizing unique word detector 710.

The equalizing unique word detector may be identical to the equalizing unique word detector used in the first receiving embodiment described in connection with FIGS. 8 and 9. The horizontal unique word detector 708 is somewhat different than the equalizing unique word detector 710 because it must provide a plurality of different outputs in response to a plurality of different horizontal unique words. The horizontal unique word detector 708 has 507 output terminals corresponding to the 507 horizontal sync pulses within each frame period. It should be noted at this point that in practice, only 490 output leads are necessary since only 490 of the horizontal lines within any frame contain picture information, and therefore the unique words corresponding to the inactive horizontal sync pulses will not have to be detected by the horizontal unique word detector 708. However, in order to simplify the explanation of the specific embodiment, it can be assumed that there are 507 output terminals of the horizontal unique word detector 708 each of which receives an output pulse in response to its corresponding horizontal unique word being detected by detector 708.

The memory unit and bit rate converter 704 is operative to receive the non-redundant lines and store them in the proper rows within a memory, the row being selected by the energized output leads of horizontal unique word detector 708, and read out the rows of information stored in the memory system in a row-by-row sequence at a 64 megabit per second bit rate. Thus, the output from the memory unit and bit rate converter will be a complete frame of PCM coded picture information and is applied to a conventional type of TV–PCM decoder 706 which receives sample and timing pulses from a timing circuit 720.

The timing circuit 720, in addition to providing sample and timing pulses to the TV–PCM decoder 706, cooperates with the sync and equalizing pulse generator 716 to generate all of the sync and equalizing pulses necessary to make up an entire TV waveform. The timing circuit 720 and sync and equalizing pulse generator 716 provide the complete sync and equalizing pulse waveform independently of all data received by the receiver with the exception of the equalizing unique word. The equalizing unique word which is received and detected identifies the start of a TV frame and therefor the equalizing unique word may be described as a frame code word. Also the equalizing spike out of the equalizing detector 710 may be thought of as a frame identifying indicia. The output of the equalizing unique word detector, which may be considered as an equalizing spike, provides frame timing to the timing circuit 720 which begins the frame of each group of synchronizing and equalizing pulses generated therein.

The output of the TV–PCM decoder 706, which is the decoded picture information representing an entire frame, and the output of the sync and equalizing pulse generator 716 which is the entire pulse waveform necessary for a TV frame, are combined in a summing circuit 714, which may be a standard OR circuit, and the output therefrom is the complete, reconstructed television waveform and may be displayed in a well known manner on a conventional television circuit or further transmitted to a plurality of other television circuits.

As stated above, the horizontal unique word detector 708 provides output pulses on 507 different output terminals, each responding to a different horizontal unique word applied at the input to the detector. One example of a detector apparatus which may be used for the horizontal unique word detector 708 of FIG. 22, is shown in detail in FIG. 23. The detector comprises a 70 stage shift register 730, having stages $S_1$ through $S_7$, which receives the data from the PSK demodulator at input terminal 726 and the 32 megabit per second bit timing pulses from the PSK demodulator at input terminal 728. The bit timing pulses shift the data pulses into shift register 730. The outputs from the 60 stages $S_{11}$ through $S_{70}$ are applied through manual switches 734 to a summing network 736 whose output in turn is compared with a threshhold level 740 in a comparator 738. The operation of the last 60 stages $S_{11}$ through $S_{70}$ in combination with the summing network 736 and comparator 738 is identical to the operation of the unique word detector illustrated in FIG. 9 and described above. Thus, every time any of the received horizontal unique words is completely loaded into the shift register 730, there will be an output from comparator 738 which energizes one input to each of a plurality of AND gates 744. In the specific embodiment described herein there are 507 AND gates corresponding to the 507 horizontal sync pulses in a frame.

The outputs from the first ten stages, $S_1$ through $S_{10}$, of shift register 750 are applied to a matrix decoder 742 of a type described above, which has 507 output terminals each corresponding to a different binary number within stages $S_1$ through $S_{10}$. The horizontal unique word detector operates as follows: Assume that line number 10 at the transmitter was non-redundant for the particular frame of interest and was transmitted to the receiver. The non-redundant information of line 10 will be preceeded by a horizontal unique word of 70 bit length in which the last 10 bits represent a binary count of 10. The data is applied to the horizontal unique word detector by means of the received data input terminal 726. When the 70 bit unique word is completely loaded into shift register 730, there will be an output from comparator 738 which energizes the upper input to all of the AND gates 744, and there will be an output pulse on output lead 10 from decoder 742 which energizes the 10th AND gate 744 thereby providing a short output pulse on the output lead $H_{10}$ of the horizontal unique word detector. It will be noted that the output pulses $H_1$ through $H_{507}$ occur in time coincidence with the last bit of a horizontal unique word.

A specific example of the timing circuit 720 and pulse generator 716 of the receiver (FIG. 22) is illustrated in FIG. 24. The timing circuit receives the equalizing spike outputs from the equalizing unique word detector via lead 804. Each spike sets flip-flop 800 and provides a reference time for the start of a frame. The output of flip-flop 800 gates clock pulses from a 64 megabit per second clock pulse generator 750 through AND gate 802 to counter 752 which may be a binary counter. The binary count in counter 752 is decoded by a decoder 754 which may be a conventional matrix decoder of the type described above.

In this particular case, the counter 752 must be capable of counting up to 2,133,075 and the decoder 754 must have 543 output terminals. The reason why these numbers are necessary in a specific embodiment is as follows: One frame of a TV waveform includes 507 horizontal sync pulses, 24 equalizing pulses and 12 vertical sync pulses, totaling 543 pulses (see FIG. 1) . Spike output pulses from decoder 754 corresponding in time to the horizontal, vertical and equalizing pulses respectively in a frame must be generated on a separate output terminals from decoder 754, thus necessitating 543 output terminals. The timing separation of the output spikes from decoder 754, each of which corresponds to a different pulse in the TV waveform, is controlled by the 64 megabit per second clock pulses and the counter 752. Since there are 4,063 clock pulse periods per horizontal line time, and since there are 525 line times within a frame, the counter 752 must have a count capacity of about 4,065 × 525 which equals 2,133,075. Matrix decoders which respond to different binary numbers on the input terminals thereto for providing output pulses on a separate output terminals are well known in the art, and for the decoder 754 it is simply a matter of interconnecting the input and output terminals by means of diodes to cause the output terminals to respond to a proper count in counters 752. Thus, the decoder may be designed so that there is an output spike on the first terminal corresponding to a binary count of 1 in counter 752. The latter output spike is passed via one of the many leads 756 through OR gate 762 to trigger the equalizing pulse multivibrator 768 which provides an output pulse having the proper equalizing pulse duration. A few counts later, corresponding in time to half of a horizontal line, there will be a spike output on the second output lead of decoder 754 which is also passed through OR gate 762 to trigger multivibrator 768. Thus, of the 543 output leads from decoder 754, 24 of them will carry equalizing spikes and will be applied to OR gate 762; 12 of them will carry vertical spikes and will be applied to OR gate 764; and 507 of them will carry horizontal spikes and will be applied to OR gate 766. The vertical spikes passing through OR gate 764 trigger a vertical sync pulse multivibrator 770 which provides output pulses of the correct duration for vertical sync pulses, and the horizontal spikes passing through OR gate 766 trigger a horizontal sync pulse multivibrator 772 which provides output pulses of the correct duration for horizontal sync pulses. Thus, at the output of OR gate 774, which combines the outputs from multivibrators 768,770 and 772, there will be a complete waveform such as that shown in waveform (*a*) of FIG. 1A with the exception that there will be no picture information. The horizontal spike output of decoder 754 corresponding to the 507th horizontal spike resets flip-flop 800 and also resets counter 752 to zero.

As stated above, the timing circuit also provides clock pulses and timing or sample pulses to the TV–PCM decoder. These pulses are provided by the circuitry illustrated in the upper part of FIG. 24. Each of the horizontal sync pulses of the output waveform are applied to a differentiator 778, and the negative output spikes therefrom, corresponding in time with the lagging edge of the horizontal sync pulses, are applied through a diode 780 and a polarity inverter 782 to the set input of flip-flop 786. The positive output spikes from the polarity inverter 782 are also sent to the read-out memory via lead 784 for the purpose of controlling the sequential read-out from the memory unit 704 (FIG. 22). Thus, the flip-flop 786 is set in response to the lagging edge of each horizontal sync pulse, and it operates to energize the lower input of AND gate 794 which passes 3,680 clock pulses at the 64 megabit per second rate to output lead 796. The number of clock pulses on lead 796 is controlled by a divide by 8 counter 792, a counter 790, and a decoder 788, all of which may be identical to similar combinations described previously herein. The sample pulses which are sent to the TV–PCM decoder appear on output lead 798.

One specific example of a memory unit and bit rate converter 704 (FIG. 22) is illustrated in block diagram form in FIG. 25. Generally, the apparatus of FIG. 25 receives subgroups of information (non-redundant lines of picture information) and identifying indicia (unique words indicating the addresses of the lines), and forms a complete group of information (entire picture information for a whole TV frame in the proper order). The unit comprises a pair of memories 810 and 812, each of which may be a shift register type memory with plural rows, that are adapted to have information read in on a row-by-row basis and read out on a row-by-row basis. Memory 810 is a non-destructive read-out memory, and memory 812 may or may not be a non-destructive read-out memory. The received non-redundant TV–PCM data is written into the correct row of memory 810 (there are 507 rows corresponding to the 507 lines in a frame) under control of a write timing generator 822 which in turn is controlled by outputs $H_1$ through $H_{507}$ from the horizontal unique word detector (FIG. 23). The latter outputs from the unique word detector are applied as inputs on leads 826 to the write timing generator.

The write timing generator 822 operates to gate and clock the received non-redundant information into the proper row of memory 810. For example, assume that the receiver receives the horizontal unique word and non-redundant TV–PCM data for line 10. In time coincidence with the last bit of the horizontal unique word an input $H_{10}$ will be applied to the write timing generator 822. The write timing generator will then pass bit timing pulses at 32 megabits per second to its 10th output terminal which gates and clocks the information on lead 816 into the 10th row of memory 810 for 3,680 clock pulse periods. As a result, the non-redundant received TV–PCM information corresponding to line 10 will be completely entered into row 10 of memory 810 thereby replacing the prior contents of row 10. During a certain period of time to be explained in more detail hereafter, the bank of AND gates 814 is energized to pass the entire contents of memory 810 into memory 812 thus providing a complete up-to-date frame of picture information in digital form in memory 812.

The 507 rows of information in memory 812 are then read-out in sequence under the control of a read timing generator 838 which responds to the H spike pulses on lead 784 (from FIG. 24) and the TV–PCM clocks on lead 796 (from FIG. 24), to read-out the information stored in memory 812 at the proper time sequence with respect to the horizontal sync pulses generated by the timing circuit and pulse generator of FIG. 24.

In order to understand the timing sequence in which the contents of memory 810 is read out and written into memory 812 it is necessary to refer back to FIG. 20 which is the bit rate reduction circuit of the bandwidth compression embodiment transmitter. From the previous discussion of FIG. 20 it will be remembered that a 60 bit equalizing word is transmitted directly following an equalizing spike, and subsequent to the 60th bit of the equalizing word the entire contents of either memory 652 or memory 668 is transmitted, all information being transmitted at a 32 megabit per second rate. It was also pointed out that each of the memories 652 and 668 has a bit capacity sufficient to hold half of the active lines in a frame, each line having a 70 bit horizontal unique word and 3,680 bits of TV–PCM data. With a memory of that capacity and in accordance with the explanation of the remainder of FIG. 20, it is apparent that the only time in which data will directly follow the 60th bit of the transmitted equalizing unique word will be when the memory is filled to capacity, and that will only occur if there are 245 or more non-redundant lines within a frame. Thus, for most cases the transmitted signal will naturally contain a period of no information between the 60th bit of the transmitted equalizing unique word and the first data bit constituting information out of one of the memories. However, in order to insure that a "free" time will always occur at the receiver, during which the contents of memory 810 (FIG. 25) can be shifted into memory 812, it is necessary to insure that the transmitted signal *always* contains a period of no information between the last bit of the equalizing unique word and the first data bit from one of memories 652 or 668 which represents information.

In the specific embodiment described herein, the amount of "free" time necessary is equal to 3,680 clock pulse periods at a 64 megabit per second clock pulse rate. The need for this amount of "free" time is explained hereinafter. Since the memories of the bit rate reduction circuit in FIG. 20 are read out at a 32 megabit per second clock rate, the required "free" time may be provided by increasing the storage capacity of memories 652 and 668 by 1,840 bits, which is exactly half of 3,680. Thus, since the counter 678-decoder 676 combination (FIG. 30) always prevents more than 245 lines from being entered into one of the memories 652 and 668, there will always be at least 1,840 bit positions within the memory that are unoccupied by any information. The contents of these so-called unoccupied bit positions are first shifted out of the memories following the equalizing unique word, and therefore 1,840 clock pulse periods at the 32 megabit per second rate, or 3,680 clock pulse periods at the 64 megabit per second rate are provided at the receiver for transferring the contents of memory 810 (FIG. 25) to memory 812.

Referring back to FIG. 25, it can be seen that the equalizing spike from the equalizing decoder, which is in time coincidence with the 60th bit of the received equalizing unique word, sets flip-flop 830 which allows clock pulses at the 64 megabit per second clock rate to pass around AND gate 832. The number of clock pulses is controlled by a counter 834-decoder 836 combination which is similar to the counter-decoder combinations described above, to reset the flip-flop 830 and the counter 834 after 3,680 clock pulses have passed through AND gate 832. The clock pulses energize the AND gates within the AND gate 814 to pass information shifted out of every row of memory 810 into the corresponding rows of memory 812. The clock pulses are also used as the shift-out and shift-in controls for the memories 810 and 812 respectively.

From the above discussion, it can be seen that the "free" time during which the contents of memory 810 is transferred to memory 812 does not interfere with the writing of information into memory 810 because during the free time no horizontal unique words are received and no non-redundant TV–PCM data is received. It will also be apparent to anyone having ordinary skill in the art that the "free time" will not interfere with the read-out of memory 812 because the equalizing spike which sets flip-flop 830 is the same equalizing spike which starts each frame time within the timing circuit and pulse generator of FIG. 24. Since the read-out timing generator 838 of FIG. 25 is controlled by the H spikes corresponding to the lagging edge of the generated horizontal sync pulses, the memory 812 will not be read-out until a relatively long time following the equalizing pulse, and that relatively long time is greater than 3,680 clock pulse periods.

Specific examples of circuits which can be used for the write timing generator 822 and the read timing generator 838 are shown in FIGS. 26 and 27, respectively. The write timing generator, shown in FIG. 26, includes 507 AND gates 854, 507 flip-flops 856, and a decoder 850-counter 852 combination which responds to a count of 3,680. Each of the flip-flops 856 is set in response to one of the output pulses $H_1$ through $H_{507}$ from the horizontal unique word detector (FIG. 23). The set flip-flop energizes the corresponding AND gate 854 to pass 3,680 clock pulses received on the bit timing lead 860, at the 32 megabit per second clock pulse rate, to the proper output terminal. For example, if the horizontal unique word for the 507th line is received, the last flip-flop will be set and the 3,680 32 megabit per second clock pulses will pass to output lead 507. The output lead 507 gates and shifts the received information into row 507 of memory 810 (FIG. 25). All of the output clock pulses from AND gates 854 are applied to the counter-decoder combination through OR gate 855. The output of decoder 850 resets all flip-flops 856 following the 3,680th input pulse to counter 852.

The read timing generator 838 which controls memory 812 (FIG. 25) is different from the write timing generator 822 because it is only necessary that the rows of memory 812 be read out in sequence. The read timing generator of FIG. 27 comprises 507 AND gates 874, 507 flip-flops 906, an OR gate 900, a counter 902-decoder 904 combination, and a counter 870-decoder 872 combination. The counter 870 resets itself internally after a count of 507, and the decoder 872 may be a typical matrix type of decoder having 507 output leads corresponding to counts within counter 870 from 1 to 507, respectively. As an alternative, instead of having counter 870 having an internal reset, an external reset may be provided by connecting the equalizing spike output from the equalizing unique word detector to a reset input terminal of counter 870. The apparatus operates in response to the H output spikes, corresponding in time to the lagging edge of the generated horizontal sync pulses, to set flip-flops 906 in sequence. The corresponding AND gate 874 which is enabled by the set flip-flop passes clock pulses which are received via lead 796 from the timing circuit shown in FIG. 24. The clock pulses passing through each of the AND gates 874 are applied to memory 812 (FIG. 25) to gate and shift the contents of the corresponding row out of memory 812. The output pulses from each AND gate 874 are applied to the counter 902 through OR gate 900. The counter 902-decoder 904 operates to reset flip-flops 906 following receipt of 3,680 pulses at the counter 902. The result is that the proper number of pulses are applied to the memory 812 to fully shift out its contents.

Referring back to the general block diagram of the receiver in FIG. 22, it can be seen that the pulse waveform from the synchronous and equalizing pulse generator 716, which includes equalizing vertical sync and horizontal sync pulses has the proper time relation with the picture information appearing at the output of TV–PCM decoder 706. Consequently, when the two outputs are passed through the summing circuit 714, the output therefrom will be a completely reconstructed television waveform representing an entire frame.

While the invention has been particularly shown and described with reference to preferred embodiments thereof, it will be understood by those skilled in the art that various changes in form and details may be made therein without departing from the spirit and scope of the invention.

What is claimed is:

1. A transmission apparatus adapted to extract and transmit non-redundant portions of picture information from a television waveform comprising, a. storage means having the capacity for storing portions of picture information the complete information being stored therein being a stored frame, b. means for comparing each new portion of picture information with the corresponding portion of said stored frame and transmitting these portions of said new frame which differ by a predetermined amount from corresponding portions of said stored frame, and c. means responsive to said comparing means for replacing the stored portions of said stored frame in said storage means with the portions of said new frame which are transmitted.

2. A transmission apparatus as claimed in claim 1 wherein said means for comparing and transmitting comprises a frequency reducing means for reducing the frequency of said transmitted lines of information prior to transmission.

3. A TV-bandwidth compression system comprising means for transmitting portions of picture information in a TV waveform which differ from corresponding portions of a prior frame by a significant amount, and receiving means for receiving the transmitted portions and combining them with stored portions from prior frames to produce a complete frame of information, said transmitting means comprising a memory means for storing the portions of picture information over a one frame period, comparison means for comparing each new portion of picture information with a corresponding stored portion in said memory means and generating an output comparison indication in response to said new and stored portions differing by at least said significant amount, means responsive to said output comparison indication for replacing said stored portion in said memory means with said new portion and for transmitting said new portion, and means for transmitting along with each of said transmitted new portions a signal indicating the position of each transmitted new portion.

4. A TV-bandwidth compression means as claimed in claim 3 wherein said receiving means comprises, a receiver memory means for storing received portions of picture information, write-in means responsive to said position indicating signals for writing the corresponding received portion into a location of said receiver memory means determined by said position indicating signal.

5. A TV-bandwidth compression system comprising means for transmitting only those lines of picture information in a TV waveform which differ from corresponding lines of a prior frame by a predetermined amount and receiving means for receiving the transmitted lines and combining them with stored lines from prior frames to produce a complete frame of information, wherein said transmitting means comprises a. memory means for storing the lines of picture information over a one frame period, b. comparison means for comparing each new line of picture information with a corresponding stored line in said memory means and generating an output comparison indication in response to said new and stored lines differing by a predetermined amount, and c. means responsive to said output comparison indication for replacing said stored line in said memory means with said new line and for transmitting said new line.

6. A TV-bandwidth compression system as claimed in claim 5 wherein said transmitter means further comprises means for transmitting along with each of said transmitted new lines a signal indicating the position of said line within a frame.

7. A TV-bandwidth compression system as claimed in claim 6 wherein said receiving means comprises
a. a receiver memory means for storing received lines of picture information,
b. write-in means responsive to said position indicating signals for writing the corresponding received line into a location of said memory means determined by said position indicating signal, and
c. read-out means for reading out all the stored lines in said receiver memory in sequence in relation to their correct position within a frame.

8. A TV-bandwidth compression system comprising means for transmitting only those lines of picture information in a TV waveform which differ from corresponding lines of a prior frame by a predetermined amount and receiving means for receiving the transmitted lines and combining them with stored lines from prior frames to produce a complete frame of information, wherein said transmitting means comprises
a. TV–PCM means for converting each line of picture information of said TV waveform into digital picture information,
b. frame identifying means for generating a frame code word identifying the start of each frame of said TV waveform, and
c. line identifying means for generating line code words, each of which identifies the position of a line of said TV waveform with respect to the beginning or each frame.

9. A TV-bandwidth compression system as claimed in claim 8 wherein said transmitting means further comprises,
a. a first memory means for storing lines of digitally coded picture information, said memory having a storage capacity sufficient to store all of the lines of picture information in a single frame of said TV waveform,
b. a comparison means for comparing each line of digital picture information from said TV–PCM means with a stored line from said memory, said compared lines having the same position within different frames of said TV waveform, and for providing a non-redundant output signal when the compared lines differ by a predetermined amount, and
c. means responsive to said non-redundant output signal for providing said line of digital picture information from said TV–PCM means at a first output terminal and for replacing said stored line in said first memory means with said line of digital picture information from said TV–PCM means whereby only those lines in a frame which are non-redundant with corresponding lines in the stored frame are transmitted.

10. A TV-bandwidth compression system as claimed in claim 9 wherein TV–PCM means, said frame identifying means, and said line identifying means all generate their respective outputs at a first bit rate.

11. A TV-bandwidth compression system as claimed in claim 10 wherein said transmitting means further comprises
a. a bit rate reduction means for receiving digital information at a first rate at an input terminal thereof and for providing said information at an output thereof at a substantially reduced bit rate,
b. first means for connecting said non-redundant lines at said first output terminal to the input terminal of said bit rate reduction means and
c. second means responsive to said non-redundant output signal for connecting only those code words out of all of said line code words which identify non-redundant lines of digital picture information to the input terminal of said bit rate reduction means.

12. A TV-bandwidth compression system as claimed in claim 11 wherein said transmitter means further comprises limiting means responsive to the amount of data applied to said input terminal of said bit rate reduction means over a one frame period for limiting the amount of data applied to said input terminal by said first and second connecting means over a one frame period to an amount which can be completely transmitted over a one frame period at said reduced bit rate.

13. A transmission apparatus adapted to extract and transmit non-redundant lines of picture information from a television waveform comprising
a. storage means for storing a frame of picture information,
b. means for comparing each new frame of picture information with said stored frame of picture information and transmitting only those lines of said new frame which differ from corresponding lines of said stored frame and
c. means for replacing the stored lines of said stored frame in said storage means with the lines of said new frame which are transmitted.

14. A transmission apparatus as claimed in claim 13 wherein said means for comparing and transmitting comprises a frequency reducing means for reducing the frequency of said transmitted lines of information prior to transmission.

15. A transmission apparatus as claimed in claim 14 wherein said means for comparing and transmitting further comprises means for transmitting a position address indication along with each of said transmitted lines to identify the position of each line within a frame.

16. A transmission apparatus as claimed in claim 15 wherein all transmitted signals are in the form of pulse coded signals.

* * * * *